US012735916B2

(12) United States Patent
Rodd

(10) Patent No.: US 12,735,916 B2
(45) Date of Patent: Sep. 15, 2026

(54) MODULAR LOCKING APPARATUS WITH AN ACTUATOR OPERATING MULTIPLE LATCHES

(71) Applicant: Aristocrat Technologies, Inc., Las Vegas, NV (US)

(72) Inventor: Donald Rodd, Palm Beach Garden, FL (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 194 days.

(21) Appl. No.: 18/417,598

(22) Filed: Jan. 19, 2024

(65) Prior Publication Data

US 2025/0237096 A1 Jul. 24, 2025

(51) Int. Cl.

| | |
|---|---|
| ***E05B 35/12*** | (2006.01) |
| ***E05B 35/08*** | (2006.01) |
| ***E05B 63/14*** | (2006.01) |
| ***E05B 65/52*** | (2006.01) |

(52) U.S. Cl.

CPC ............ *E05B 35/12* (2013.01); *E05B 63/143* (2013.01); *E05B 65/523* (2013.01); *E05B 35/086* (2013.01)

(58) Field of Classification Search

CPC .......... E05B 35/08; E05B 35/12; E05B 63/14; E05B 63/143; E05B 65/006; E05B 65/461; E05B 65/464; E05B 65/523; E05B 35/086

See application file for complete search history.

(56) References Cited

U.S. PATENT DOCUMENTS 853,485 A * 5/1907 Townsend ............... E05B 35/12 70/339
869,533 A * 10/1907 Taylor ..................... E05B 35/12 70/339
960,421 A * 6/1910 Sibley ..................... E05B 35/12 70/385
972,241 A * 10/1910 Prindle ................... E05B 35/12 70/385
996,726 A * 7/1911 Murphy .................. E05B 35/12 70/339

(Continued)

FOREIGN PATENT DOCUMENTS

AU 785436 B2 5/2007
FR 2861415 A1 * 4/2005 ............ E05B 35/08

(Continued)

*Primary Examiner* — Christine M Mills
*Assistant Examiner* — Faria F Ahmad
(74) *Attorney, Agent, or Firm* — Weaver Austin Villeneuve & Sampson LLP

(57) ABSTRACT

A modular locking apparatus includes a first actuator transitionable between a first state and a second state. The apparatus further includes a latching mechanism with a first set of one or more latches and a second set of one or more latches. Each latch in the first set of one or more latches and each latch in the second set of one or more latches are configured to be transitioned between a corresponding latched state and a corresponding unlatched state. Each latch in the first set of one or more latches and each latch in the second set of one or more latches simultaneously transition between the latched state and the unlatched state responsive to the first actuator transitioning between the corresponding first state and the corresponding second state.

20 Claims, 19 Drawing Sheets

(56) References Cited

U.S. PATENT DOCUMENTS

| | | | | | |
|---|---|---|---|---|---|
| 1,587,108 | A * | 6/1926 | Eras | E05B 35/12 | 70/451 |
| 1,603,890 | A * | 10/1926 | Archer | E05B 35/12 | 70/448 |
| 1,630,238 | A * | 5/1927 | Benham | E05B 35/12 | 70/419 |
| 1,665,016 | A * | 4/1928 | Benham | E05B 35/12 | 70/460 |
| 2,064,474 | A * | 12/1936 | Hopkins | G07C 1/20 | 70/389 |
| 2,150,371 | A * | 3/1939 | Furnish | B60P 1/6436 | 292/25 |
| 2,220,786 | A * | 11/1940 | Grainger | E05B 35/086 | 70/389 |
| 2,762,216 | A * | 9/1956 | Wasson | E05B 35/12 | 70/339 |
| 3,010,306 | A * | 11/1961 | Toepfer | E05B 35/08 | 70/337 |
| 3,103,806 | A * | 9/1963 | Ellis | E05B 35/12 | 70/334 |
| 3,127,759 | A * | 4/1964 | Ellis | E05B 35/12 | 70/339 |
| 3,154,938 | A * | 11/1964 | Cohen | E05B 35/12 | 70/265 |
| 3,157,043 | A * | 11/1964 | Ellis | E05B 35/12 | 70/134 |
| 3,501,933 | A * | 3/1970 | Carlsson | E05B 9/084 | 70/451 |
| 3,744,829 | A * | 7/1973 | Germer | E05C 9/1833 | 292/96 |
| 3,966,116 | A * | 6/1976 | Dominick | G07F 9/06 | 232/7 |
| 4,332,153 | A * | 6/1982 | Miles | E05B 35/12 | 70/385 |
| 4,359,884 | A * | 11/1982 | Miles | E05B 35/12 | 70/385 |
| 4,441,347 | A * | 4/1984 | Taylor | E05B 35/12 | 70/451 |
| 4,567,741 | A * | 2/1986 | Trempala | E05B 35/086 | 70/389 |
| 4,641,509 | A * | 2/1987 | Batchelor | E05B 35/086 | 70/389 |
| 4,986,576 | A * | 1/1991 | Anderson | E05B 35/08 | 292/DIG. 31 |
| 5,020,347 | A * | 6/1991 | Logan | E05B 35/086 | 70/389 |
| 5,172,944 | A * | 12/1992 | Munich | E05C 9/021 | 292/51 |
| 5,372,021 | A * | 12/1994 | Smith | E05B 35/086 | 70/389 |
| 5,505,066 | A * | 4/1996 | Baucom | E05B 35/086 | 70/389 |
| 5,533,605 | A * | 7/1996 | Mays | G07F 9/06 | 232/15 |
| 5,662,204 | A * | 9/1997 | Menke | G07F 9/06 | 194/215 |
| 5,813,914 | A * | 9/1998 | McKay | G07F 17/32 | 312/328 |
| 5,944,163 | A * | 8/1999 | Keith, III | G07D 11/0093 | 235/379 |
| 6,117,010 | A * | 9/2000 | Canterbury | G07F 17/32 | 463/20 |
| 6,178,792 | B1 * | 1/2001 | Glazier | E05B 35/086 | 70/389 |
| 6,352,175 | B2 * | 3/2002 | Izawa | G07D 11/13 | 221/197 |
| 6,612,142 | B1 * | 9/2003 | Capwell | E05B 35/12 | 70/355 |
| 6,712,352 | B2 * | 3/2004 | Bergeron | G07D 11/13 | 271/181 |
| 6,837,084 | B2 * | 1/2005 | Bailey | E05B 35/086 | 70/389 |
| 7,178,839 | B2 * | 2/2007 | Tsai | E05B 65/0858 | 292/25 |
| 7,604,265 | B2 * | 10/2009 | Tsai | E05B 65/0858 | 292/28 |
| 7,905,521 | B2 * | 3/2011 | Liang | E05B 65/0858 | 292/199 |
| 7,965,190 | B2 * | 6/2011 | Maloney | G08B 13/196 | 340/568.1 |
| RE42,929 | E * | 11/2011 | Canterbury | G07F 17/3202 | 463/20 |
| 8,419,550 | B2 | 4/2013 | Anthony | | |
| 8,661,864 | B1 * | 3/2014 | Guessford | E05B 35/086 | 70/389 |
| 8,931,812 | B1 * | 1/2015 | Hauber | E05C 19/12 | 292/37 |
| 9,076,282 | B2 * | 7/2015 | Anderson | G07F 17/3211 | |
| 10,487,542 | B2 | 11/2019 | Vetter | | |
| 11,587,389 | B2 * | 2/2023 | Barbour | F16M 11/046 | |
| 11,719,027 | B2 * | 8/2023 | Alexander | A47G 29/10 | 292/49 |
| 11,833,436 | B2 * | 12/2023 | McClintock | A63F 13/90 | |
| 2006/0188304 | A1 * | 8/2006 | Yamazaki | G03G 21/1619 | 399/388 |
| 2007/0113606 | A1 * | 5/2007 | Carter | E05B 35/12 | 70/337 |
| 2009/0241619 | A1 * | 10/2009 | Kuester | E05B 11/00 | 70/389 |
| 2017/0022734 | A1 * | 1/2017 | Callahan, III | E05B 35/12 | |
| 2020/0325709 | A1 * | 10/2020 | Irwin | E05B 11/00 | |
| 2022/0333415 | A1 * | 10/2022 | Alexander | E05B 35/12 | |
| 2025/0146328 | A1 * | 5/2025 | Hüwel | F16B 21/02 | |
| 2025/0146329 | A1 * | 5/2025 | Rodd | E05B 63/14 | |

FOREIGN PATENT DOCUMENTS

| | | | | |
|---|---|---|---|---|
| GB | 2278391 | A * | 11/1994 | E05B 35/08 |
| KR | 101502787 | B1 * | 3/2015 | E05B 35/08 |

* cited by examiner

MODULAR LOCKING APPARATUS WITH AN ACTUATOR OPERATING MULTIPLE LATCHES

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

Electronic gaming machines are complex devices and are often housed within cabinets having multiple access points in the form of doors or trays that may be opened or slid out in order to access internal components, cables, connectors, etc.

SUMMARY

Disclosed herein is a modular locking apparatus having a first actuator configured to simultaneously transition multiple latches from a latched state to an unlatched state; such modular locking apparatuses may be particularly well-suited for use in electronic gaming machines. As indicated above, electronic gaming machines often have cabinets with access panels, doors, or slide-out trays, or separate enclosures (e.g., a bill validator cage) within the cabinet each having its own access panel, door, or slide-out tray. Each access panel, door, or slide-out tray may be opened or slid out in order to access the contents or internal components of such devices (e.g., a cash box within an interior of the bill validator cage). Such electronic gaming machines may include various latch mechanisms that may be used to secure such access panels, doors, or slide-out trays in place, thereby preventing unauthorized access to the contents or internal components of such devices, e.g., in response to impact or pulling and/or prying the access panels, doors, or slide-out trays.

The modular locking apparatus discussed herein incorporate each latch in a first set of one or more latches (i.e., one or more teeth for a corresponding one or more latch points) and each latch in a second set of one or more latches (i.e., one or more teeth for a corresponding one or more latch points). While each latch in the first set of one or more latches is independently movable relative to each latch in the second set of one or more latches, the first set of one or more latches and the second set of one or more latches may be caused to simultaneously transition from a latched state to an unlatched state responsive to a single input provided to a first actuator, e.g., an actuator cam lock. The modular locking apparatus may be particularly well-suited for latching doors or trays in situations in which it is desirable to provide multiple points of securement to the item being latched. For example, an access door that has a single latch point may be more vulnerable to being pried open or being twisted about the single latch point than if it were to be latched at two or more separate, spaced-apart locations. Moreover, the modular locking apparatus may also be well-suited for use in mechanisms in which it is desirable to release multiple latch points simultaneously. For example, some electronic gaming machines have a bill validator cage, which generally refers to an enclosure that contains a separate cash box used to securely store money. Gambling facilities with multiple electronic gaming machines may have employees (i.e., a drop team) collecting the cash boxes from the corresponding bill validator cages, installing empty cash boxes in the corresponding bill validator cages, and transporting the collected cash boxes to a secure count room where money is retrieved from each of the cash boxes and fed through a currency counter. Each bill validator cage may have a plurality of walls and a door movable to a closed position to define an interior where the cash box is stored. If a single latch point is used to secure such a door in the closed position, there is a risk that a person may attempt to gain unauthorized access to the cash box in the bill validator cage by prying and/or impacting a corner of the door spaced apart from the single latch point, which may, in turn, damage the door and/or the latch and/or allow the door to be moved from the closed position to the open position. If multiple latch points are used to secure such a door in the closed position, one or more humans may operate a plurality of separate actuators (e.g., a plurality of cam locks) to release or secure a corresponding one of the multiple latch points.

Also disclosed herein is the modular locking apparatus having an actuator adaptor that allows the first actuator may be from a set of two or more actuators having a corresponding one of two or more different configurations (i.e., with a plurality of corresponding lengths different from one another) to be installed in the modular locking apparatus and transmit a rotational force from any of those actuators to a common cam member. The actuator adaptor includes one or more keying features configured to interlock with the first actuator and extending along a center axis from a first adaptor end portion to a second adaptor end portion, such that the first actuator in the set of two or more actuators has a first cam element in a first position interlocked with the first adaptor end portion and a second actuator in the set of two or more actuators has a second cam element in a second position interlocked with the second adaptor end portion. In one example where such modular locking apparatus is newly purchased directly from a manufacturer or a distributor, the first actuator installed in the modular locking apparatus may be a dummy lock without a lock cylinder (i.e., a thumb lock that does not require a key to transition the first actuator from a first state to a second state). The first actuator may include a body, a manually-operated handle (e.g., a knob, a wing nut, etc.) rotatable relative to the body, a shaft interlocked with the handle so as to constrain rotational movement of the knob relative to the handle, and a cam element interlocked with the shaft so as to constrain rotational movement of the cam element relative to the shaft, such that the cam element transitions between the first state and the second state responsive to a human rotating the handle in a corresponding one of two rotational directions. After purchasing the modular locking apparatus, the customer may replace the first actuator with the second actuator, i.e., a cam lock having the customer's preferred configuration and/or obtained from the customer's preferred lock vendor. The cam lock may further include a lock cylinder keyed, according to the customer's preference, to a common key or a batch of keys. The adaptor allows multiple different cam locks (i.e., cam locks having a corresponding one of multiple configurations and/or lengths, obtained from a corresponding one of multiple different lock vendors, having lock cylinders keyed to a common key, and/or having lock cylinders keyed to a batch of different keys) having a plurality of lock cylinders of different lengths to be installed in the modular locking apparatus without modifying other components of the modular locking apparatus (e.g., spacers, cams, latches, etc.) such that the adaptor can transmit a rotational force from any of those cam locks to a common cam member and cause multiple latches to simultaneously transition from the latched state to the unlatched state.

In some implementations, the modular locking apparatus may further include a lockout device including a lockout cam member and movable to a first configuration where the lockout cam member prevents the first actuator from transitioning from the first state to the second state and a second configuration where the lockout cam member allows the first actuator to transition from the first state to the second state. In other implementations, the lockout device may be disabled or entirely removed from the modular locking apparatus such that the lockout device does not prevent the first actuator from transitioning from the first state to the second state. For instance, in one implementation, the modular locking apparatus may include a retainer element configured to hold the lockout device in the second configuration and may not include one or more components of the lockout device (e.g., a lockout cam lock) that may, in other implementations, be used to move the lockout device from the first configuration to the second configuration. In still other examples, the modular locking apparatus may not include any components of the lockout device (i.e., the locking cam lock, a lockout adaptor, and the lockout cam member).

Such implementations of the modular locking apparatus with both the first actuator and the lockout device each with a corresponding adaptor and a corresponding cam member are discussed herein. The first actuator and the latching mechanism are discussed first, with discussion of the lockout device discussed afterwards.

In some implementations, an apparatus may be provided that includes a housing and a first actuator transitionable between a first state and a second state. The apparatus may further include a latching mechanism with a first set of one or more latches and a second set of one or more latches. Each latch in the first set of one or more latches may be configured to be transitioned between a corresponding latched state and a corresponding unlatched state. Each latch in the second set of one or more latches may be configured to be transitioned between a corresponding latched state and a corresponding unlatched state. Each latch in the first set of one or more latches and each latch in the second set of one or more latches may simultaneously transition from the corresponding latched state to the corresponding unlatched state responsive to the first actuator transitioning from the first state to the second state. Furthermore, each latch in the first set of one or more latches and each latch in the second set of one or more latches may simultaneously transition from the corresponding unlatched state to the corresponding latched state when the first actuator is in the first state.

In some implementations, the latching mechanism may further include a first latch body having the first set of one or more latches. The first latch body may be translatable relative to the housing and between an extended position relative to the housing and a retracted position relative to the housing to cause each latch in the first set of one or more latches to be in a corresponding one of the corresponding latched state and the corresponding unlatched state. The latching mechanism may further include a second latch body having the second set of one or more latches. The second latch body may be translatable relative to the housing and between an extended position relative to the housing and a retracted position relative to the housing to cause each latch in the second set of one or more latches to be in a corresponding one of the corresponding latched state and the corresponding unlatched state. The latching mechanism may further include a common cam member rotatable about a first center axis relative to the housing and between a first rotational position relative to the housing and a second rotational position relative to the housing. The common cam member may have a first cam surface and a second cam surface collectively configured to simultaneously exert, responsive to the common cam member rotating from the first rotational position to the second rotational position, an opposing lateral force on a corresponding one of the first latch body and the second latch body and cause a corresponding one of the first latch body and the second latch body to simultaneously translate from the extended position to the retracted position such that each latch in the first set of latches and each latch in the second set of latches transitions from the corresponding latched state to the corresponding unlatched state.

In some implementations, the housing may include a panel having an actuator aperture in which the first actuator Is installed. The first actuator may include a cam element rotatable about the first center axis when the first actuator is installed in the actuator aperture in the panel. The latching mechanism may further include an actuator adaptor having two or more keying features configured to interlock with a corresponding one of the cam element and the common cam member so as to constrain rotation of the actuator adaptor relative to the cam element and the common cam member and transmit a rotational force from the cam element to the common cam member.

In some implementations, the first actuator may be one actuator from a set of two or more actuators. The first actuator in the set of two or more actuators may have an end portion including a first cam element. The first cam element, when the first actuator is installed in the actuator aperture in the panel, may be spaced a first distance from the panel and located in a first position along the first center axis. A second actuator in the set of two or more actuators may have an end portion including a second cam element. The second cam element, when the second actuator is installed in the actuator aperture in the panel, may be spaced a second distance from the panel and located in a second position along the first center axis. Each corresponding actuator keying feature may extend along the first center axis such that those keying features are configured to interlock with the first cam element in the first position when the first actuator is installed in the actuator aperture in the panel and the second cam element in the second position when the second actuator is installed in the actuator aperture in the panel.

In some implementations, the corresponding actuator keying features of the actuator adaptor interlocking with the cam element may extend a length along the first center axis from a first adaptor end portion to a second adaptor end portion. The length may be at least the difference between the first distance from the panel and the second distance from the panel, such that the first adaptor end portion of the corresponding actuator keying features are configured to engage the first cam element in the first position when the first actuator is installed in the actuator aperture in the panel and the second adaptor end portion of the corresponding actuator keying features are configured to engage the second cam element in the second position when the second actuator is installed in the actuator aperture in the panel.

In some implementations, the corresponding actuator keying features of the actuator adaptor interlocking with the cam element may extend a length up to 1.25 inches along the first center axis.

In some implementations, the common cam member may include a collar portion interlocked with the actuator adaptor. The common cam member may further have a first cam portion including the first cam surface and a second cam portion including the second cam surface. The first cam portion and the second cam portion may extend from the collar portion such that the first cam surface and the second cam surface are spaced from one another along the first center axis.

In some implementations, the first cam portion and the second cam portion may extend from opposite faces of the collar portion and along the first center axis.

In some implementations, the first cam portion and the second cam portion may be located on diametrically opposite sides of the collar portion and with the first center axis interposed therebetween.

In some implementations, the first latch body may include a first actuator aperture, and the second latch body may include a second actuator aperture. The first actuator may be one actuator from a set of two or more actuators. The first actuator in the set of two or more actuators may have an end portion including a first cam element. The first cam element may be, when the first actuator is installed in the actuator aperture in the panel, spaced a first distance from the panel and located in a first position along the first center axis. A second actuator in the set of two or more actuators may have an end portion including a second cam element. The second cam element may be, when the second actuator is installed in the actuator aperture in the panel, spaced a second distance from the panel and located in a second position along the first center axis. The first cam portion may be in the first actuator aperture of the first latch body, and the second cam portion may be in the second actuator aperture of the second latch body when the first actuator is installed in the actuator aperture in the panel and when the second actuator is installed in the actuator aperture in the panel.

In some implementations, the latching mechanism may further include a spacer plate disposed between the first latch body and the second latch body. The spacer plate and the first latch body may have a first pair of sliding interfaces configured to permit the first latch body to translate relative to the spacer plate and the housing along a first translation axis. The spacer plate and the second latch body may have a second pair of sliding interfaces configured to permit the second latch body to translate relative to the spacer plate and the housing along a second translation axis.

In some implementations, the spacer plate may include an actuator clearance aperture. The collar portion may be in the actuator clearance aperture of the spacer plate when the first actuator is connected to the housing and when the second actuator is connected to the housing.

In some implementations, the first latch body may have a first plate including a first cam follower surface. The second latch body may have a second plate including a second cam follower surface. The first cam surface and the second cam surface of the common cam member may each exert an opposing lateral force on a corresponding one of the first cam follower surface of the first plate and the second cam follower surface of the second plate to cause a corresponding one of the first set of one or more latches and the second set of one or more latches to simultaneously transition from the corresponding latched state to the corresponding unlatched state responsive to the common cam member rotating from the first rotational position to the second rotational position.

In some implementations, the first latch body may include a side having a first region and a second region spaced apart from one another. The first latch body may further include a first latch in the first set of one or more latches located in the first region of the side. The first latch body may further include a second latch in the first set of one or more latches located in the second region of the side.

In some implementations, the second latch body may include a side having a first region and a second region spaced apart from one another. The second latch body may further include a first latch in the second set of one or more latches located in the first region of the side. The second latch body may further include a second latch in the second set of one or more latches located in the second region of the side.

In some implementations, the apparatus may further include an enclosure having a plurality of walls and a door movable between an open position and a closed position. The plurality of walls and the door may collectively define an interior when the door is in the closed position. Each latch in the first set of one or more latches and each latch in the second set of one or more latches may be configured to engage one or more of the walls so as to collectively secure the door in the closed position when the door is in the closed position and each latch in the first set of one or more latches and each latch in the second set of one or more latches is in the corresponding latched state. Each latch in the first set of one or more latches and each latch in the second set of one or more latches may be configured to be spaced apart from the walls so as to collectively release the door from the closed position and allow the door to be transitioned to the open position when each latch in the first set of one or more latches and each latch in the second set of one or more latches is caused to transition from the corresponding latched state to the corresponding unlatched state. Each latch in the first set of one or more latches and each latch in the second set of one or more latches may include a tapered feature configured to engage, when each latch in the first set of one or more latches and each latch in the second set of one or more latches are in the corresponding latched state and the door is moved from the open position toward the closed position, one or more walls to cause those latches to move from the corresponding latched state to the corresponding unlatched state and permit the door to be moved to the closed position.

In some implementations, the apparatus may further include a lockout device movable between a first configuration and a second configuration relative to the housing. The lockout device, when in the first configuration, may prevent the first actuator from transitioning from the first state to the second state. The lockout device, when in the second configuration, may allow the first actuator to transition from the first state to the second state.

In some implementations, the first actuator may be an actuator cam lock, and the lockout device may be a lockout cam lock. The latching mechanism may include a common cam member rotatable about a first center axis relative to the housing between a first rotational position and a second rotational position. The common cam member may have a first cam surface and a second cam surface configured to, responsive to the common cam member rotating from the first rotational position to the second rotational position, simultaneously transition each latch in the first set of latches and each latch in the second set of latches transition from the corresponding latched state to the corresponding unlatched state. The latching mechanism may further include an actuator adaptor having one or more actuator keying features configured to interlock with the actuator cam lock and the common cam member so as to constrain rotation of the actuator cam lock relative to the common cam member and transmit a rotational force from the actuator cam lock to the common cam member. The latching mechanism may further include a lockout cam member rotatable about a second center axis relative to the housing between a third rotational position and a fourth rotational position. The lockout cam member may include a locking feature in a locked position configured to engage, when in the third rotational position, the common cam member and block movement of the common cam member from the first rotational position to the second rotational position. The lockout cam member, when in the fourth rotational position, may include the locking feature in an unlocked position spaced from the common cam member to provide clearance for rotation of the common cam member from the first rotational position to the second rotational position. The latching mechanism may further include a lockout adaptor having one or more lockout keying features configured to interlock with the lockout cam lock and the lockout cam member so as to constrain rotation of the lockout cam lock relative to the lockout cam member and transmit a rotational force from the lockout cam lock to the lockout cam member.

In some implementations, the actuator cam lock may be in a set of two or more actuator cam locks having a plurality of corresponding configurations. The actuator keying features of the actuator adaptor may extend along the first center axis such that those actuator keying features are configured to interlock with each actuator cam lock in the set of two or more actuator cam locks when that corresponding actuator cam lock is installed in the housing. The lockout cam lock may be in a set of two or more lockout cam locks having a plurality of corresponding configurations. The lockout keying features of the lockout adaptor may extend along the second center axis such that those lockout keying features are configured to interlock with each lockout cam lock in the set of two or more lockout cam locks when that corresponding lockout cam lock is installed in the housing.

In some implementations, the latching mechanism may further include a first set of one or more force-biasing devices interposed between the housing and the first set of one or more latches The first set of one or more force-biasing devices may be configured to urge the first set of one or more latches from the unlatched position to the latched position. The latching mechanism may further include a second set of one or more force-biasing devices interposed between the housing and the second set of one or more latches. The second set of one or more force-biasing devices may be configured to urge the second set of one or more latches from the unlatched position to the latched position.

The Figures are provided for the purpose of providing examples and clarity regarding various aspects of this disclosure and are not intended to be limiting.

DETAILED DESCRIPTION

The following discussion provides overall context for electronic gaming machines, some of which may include an enclosures such as those discussed later herein starting with FIG. 4 and a modular locking apparatus discussed later herein starting with FIG. 6.

Figure 1:
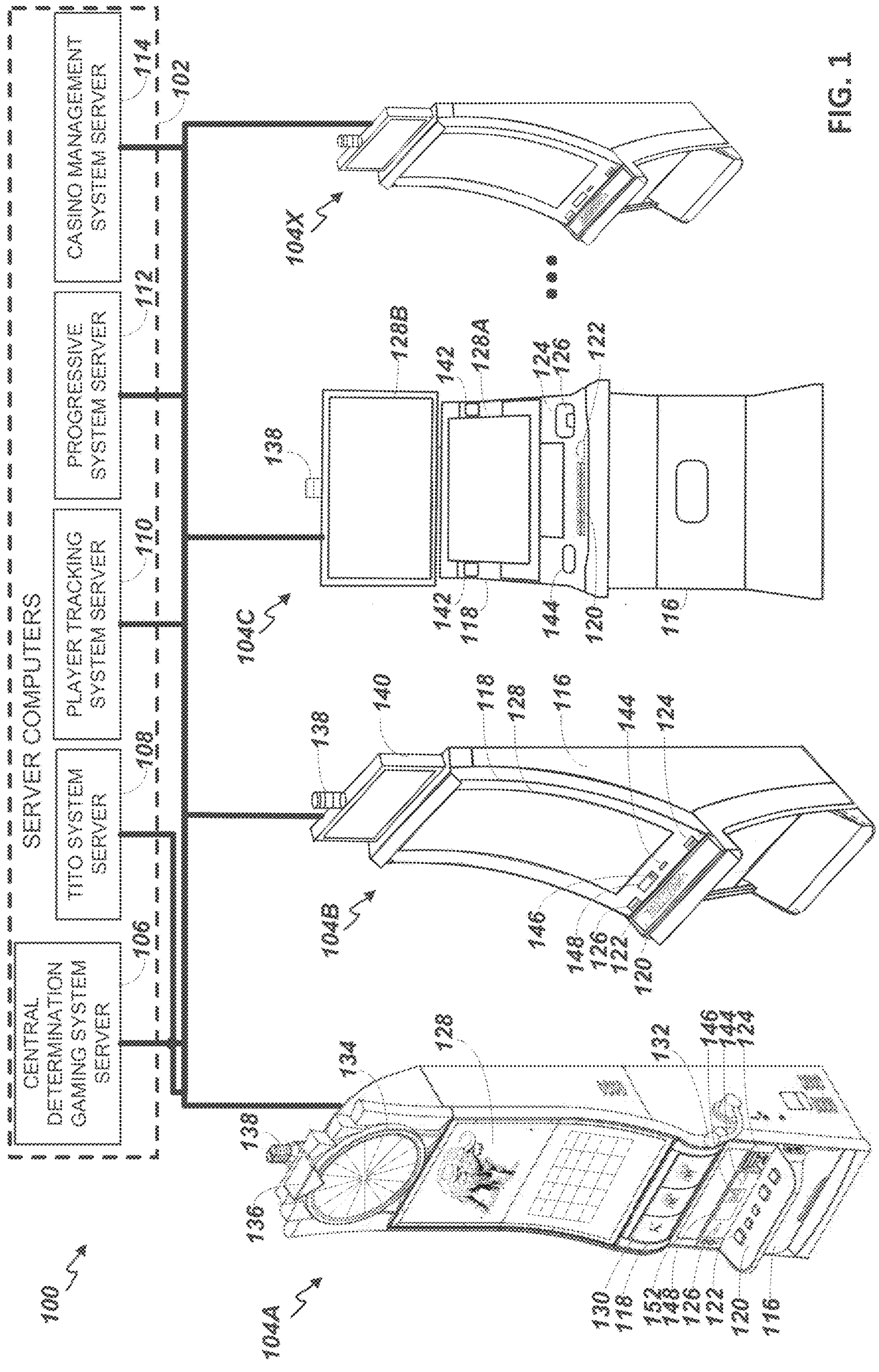
FIG. 1 is an exemplary diagram showing several EGMs networked with various gaming-related servers.

FIG. 1 illustrates several different models of EGMs which may be networked to various gaming-related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementations, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
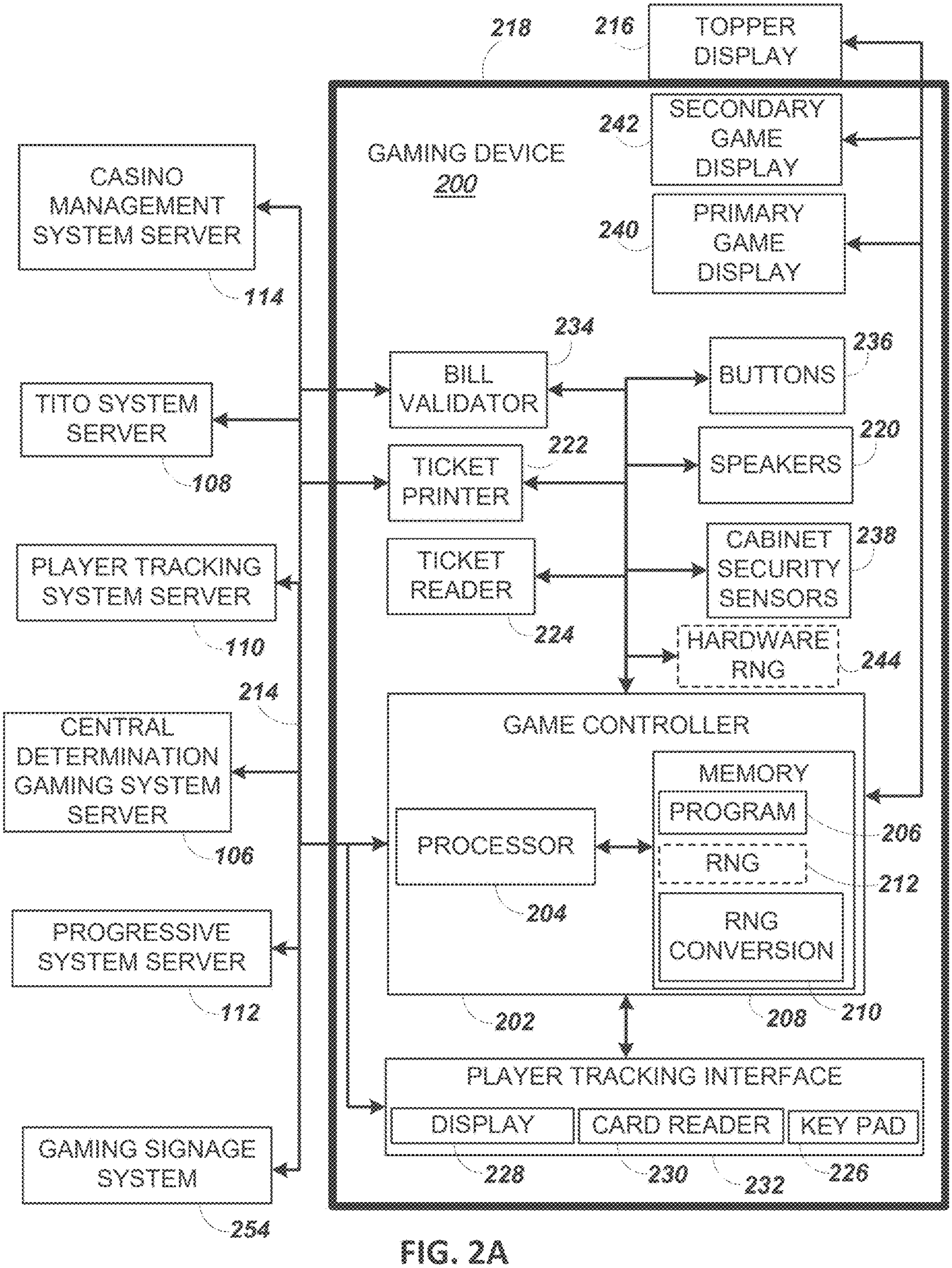
FIG. 2A is a block diagram showing various functional elements of an exemplary EGM.

Many or all the above-described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video blackjack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS© system manufactured by Aristocrat© Technologies, Inc. Player tracking system server 110 is used to track play (e.g., amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
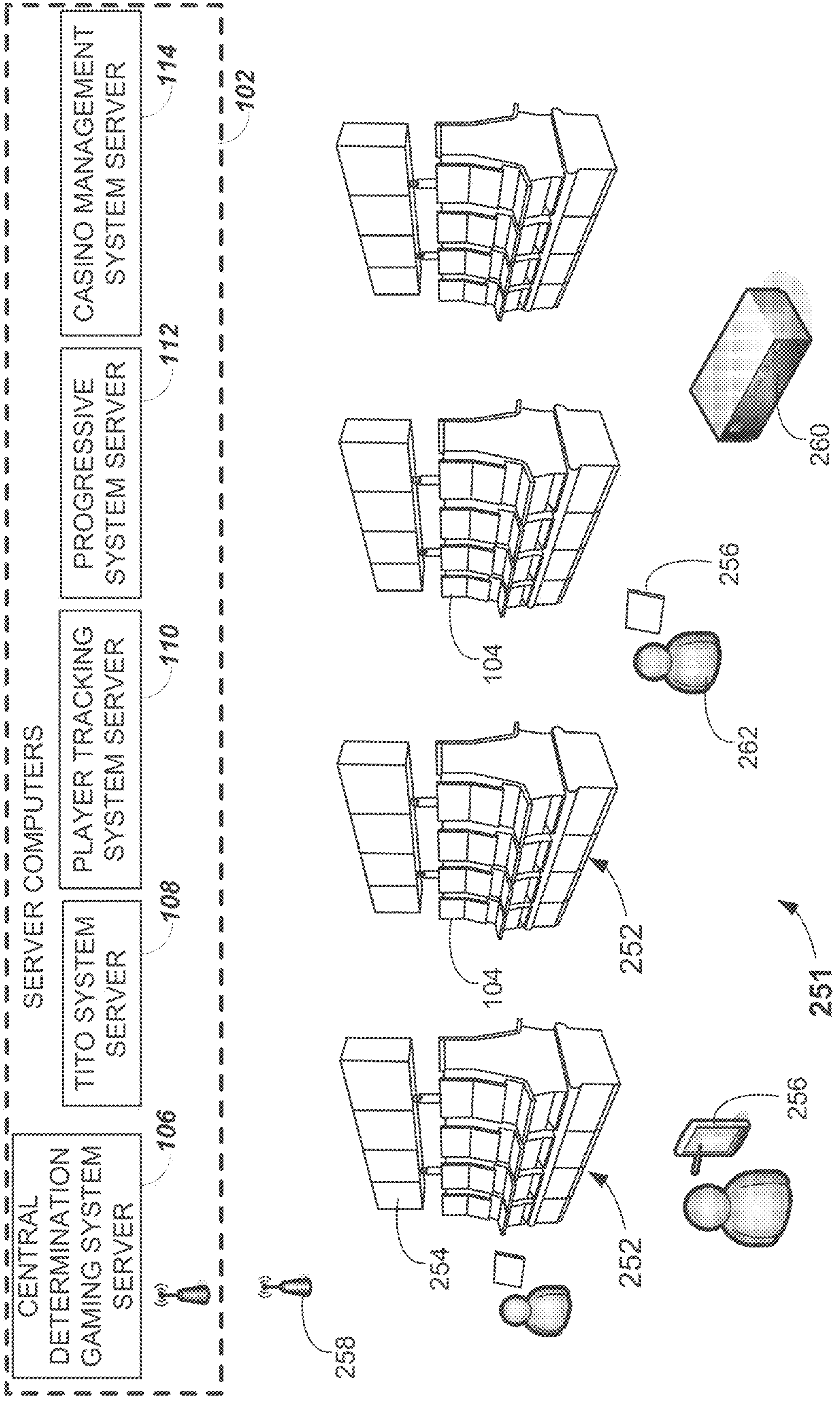
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
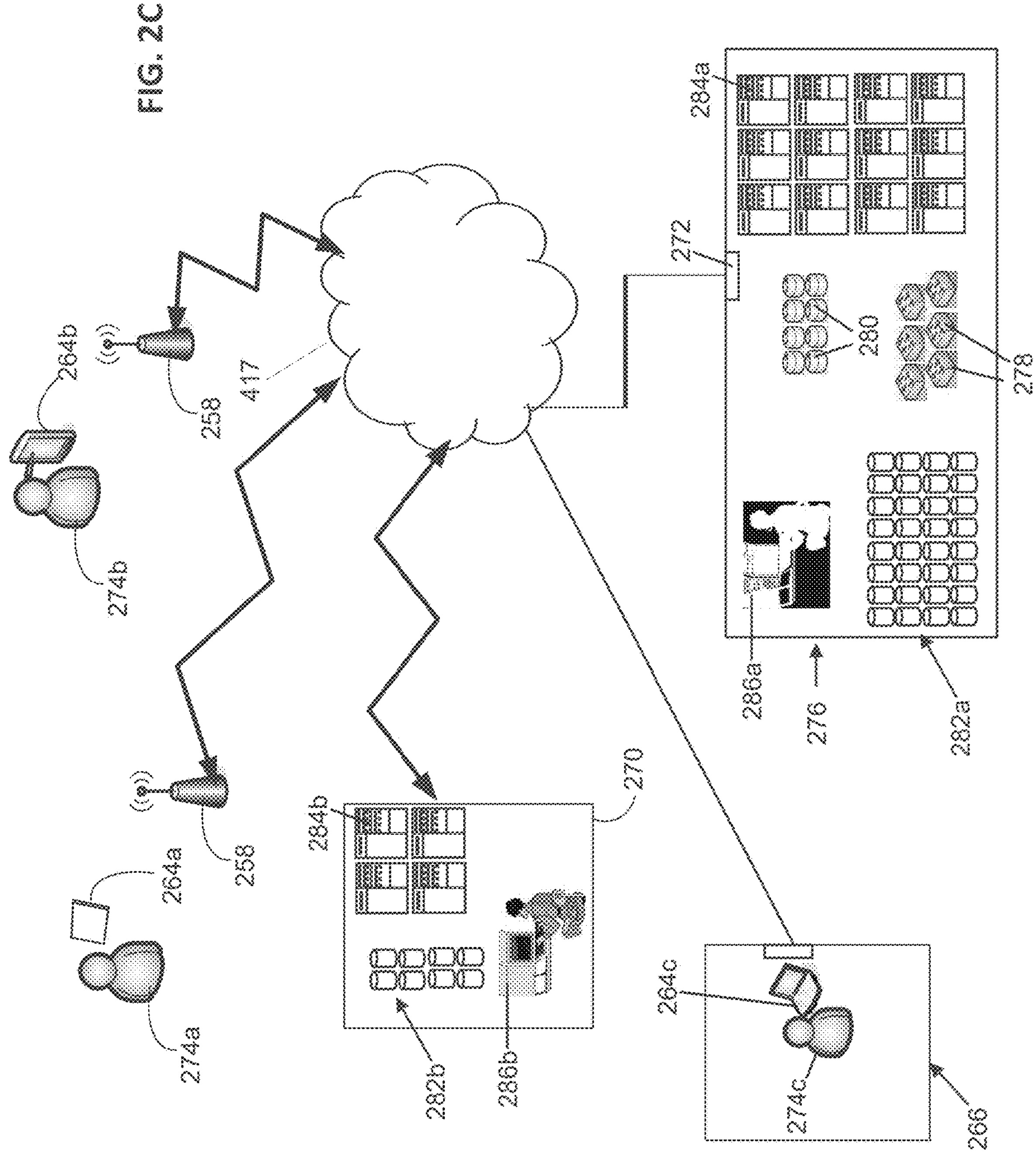
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 may, for example, be a remote gaming server (RGS) or similar system in some implementations. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 286*b*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
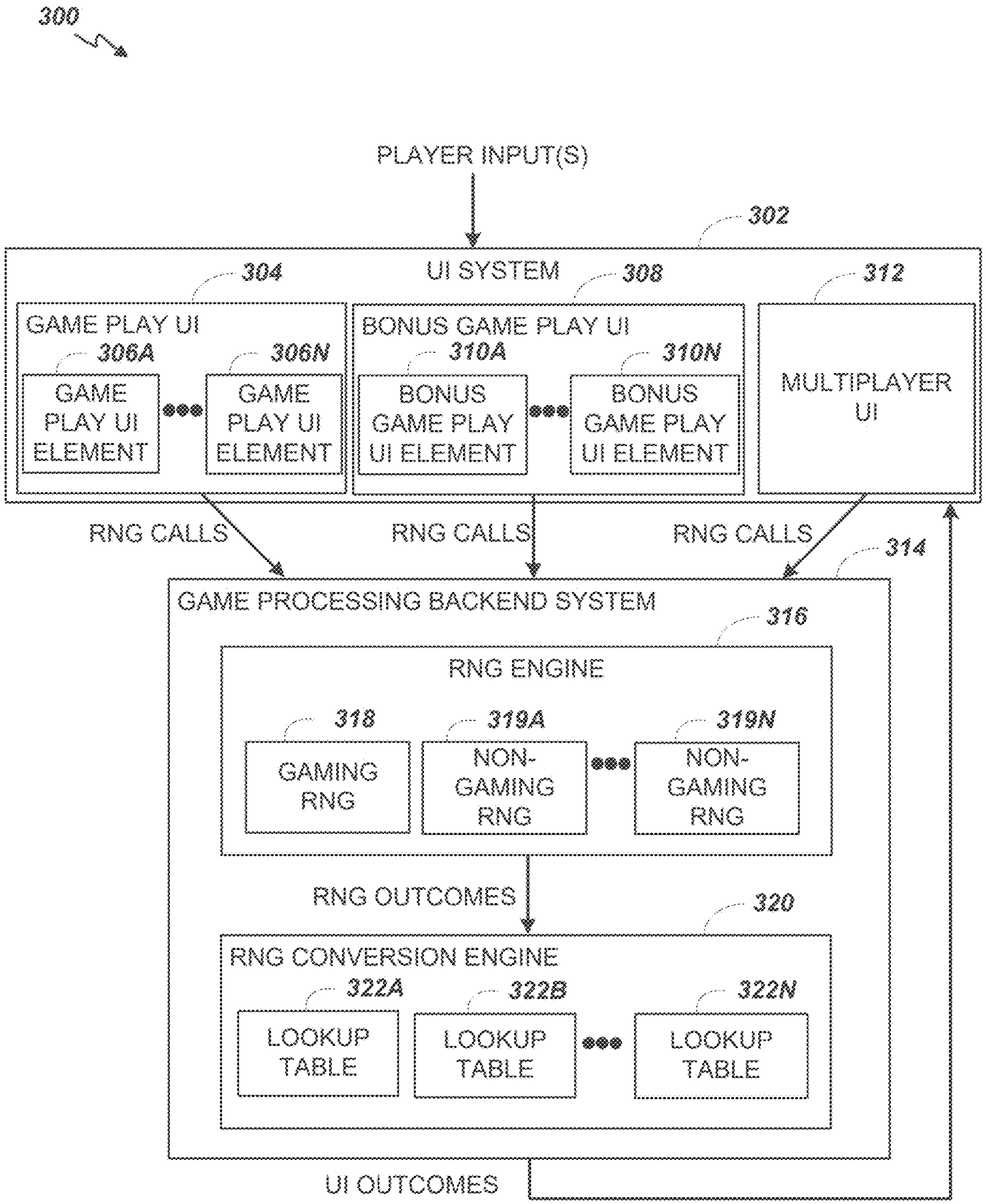
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4A:
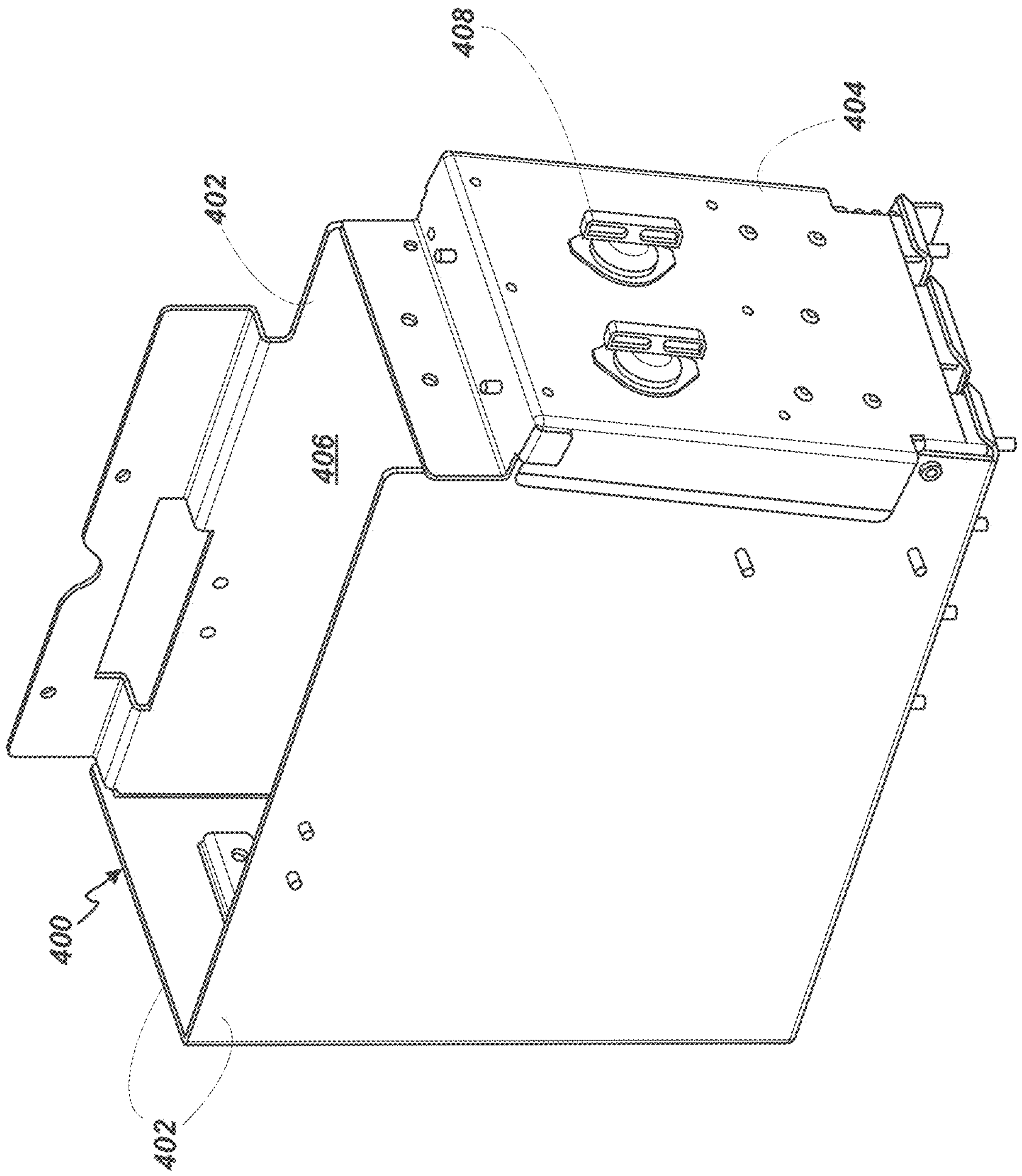
FIGS. 4A and 4B depict perspective views of an example implementation of an enclosure for a gaming machine cabinet, with the enclosure having a plurality of walls and a door movable between a closed position (FIG. 4A) to collectively define an interior and an open position (FIG. 4B).
Figure 4B:
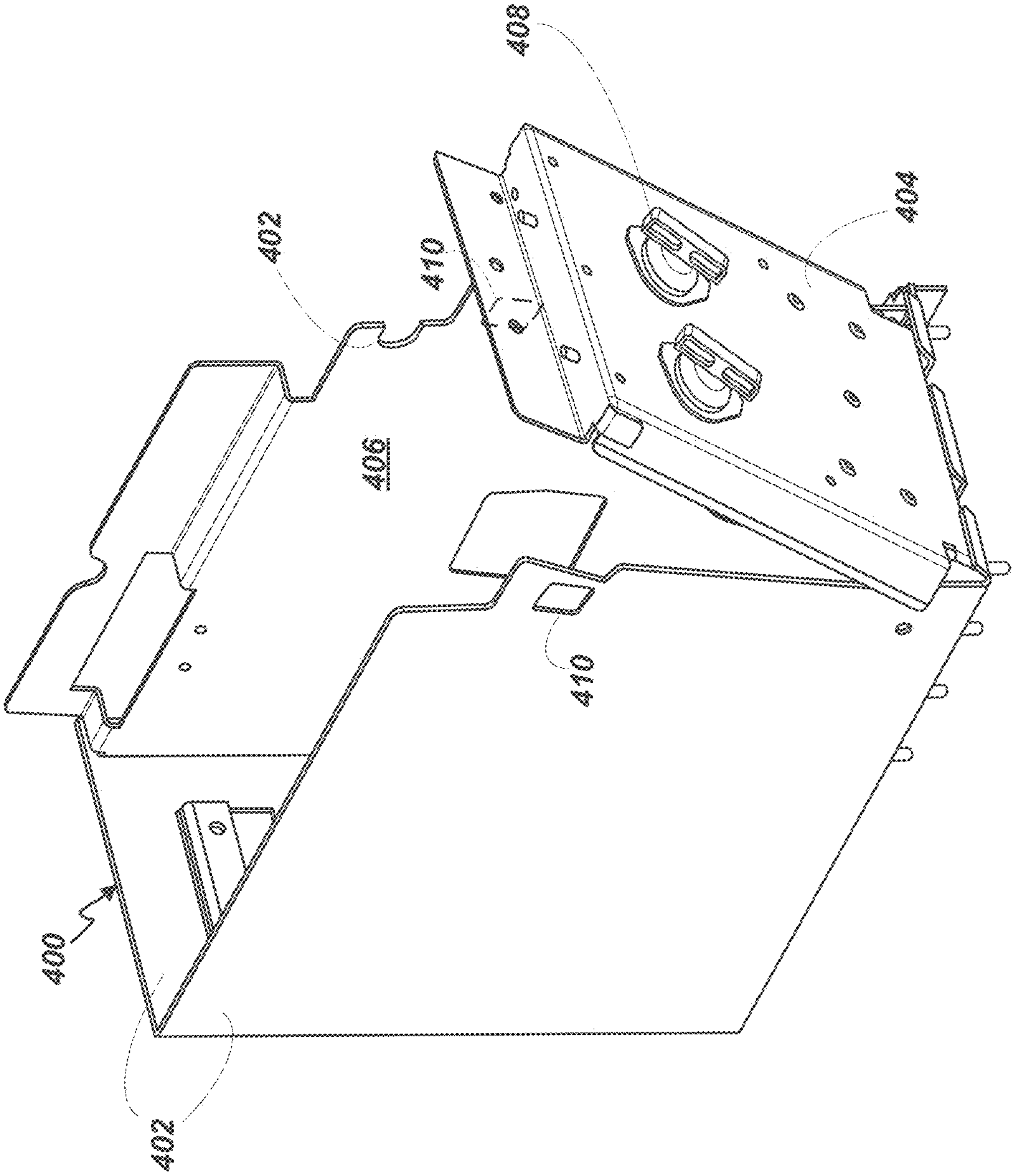

As discussed earlier, electronic gaming machines such as those discussed above may include have cabinets with access panels, doors, or slide-out trays, or separate enclosures (e.g., a bill validator cage) within the cabinet each having its own access panel, door, or slide-out tray discussed herein. FIGS. 4A and 4B depict perspective views of an example enclosure in which a modular locking apparatus 408 may be installed and which will be used for reference in the following discussion. It will, however, be appreciated that the enclosure of FIGS. 4A and 4B and the modular locking apparatus 408 are but one example of such an enclosure and a modular locking apparatus, and that other implementations embodying the concepts discussed herein are to be understood to also be within the scope of this disclosure.

In FIGS. 4A and 4B, an example enclosure 400 (e.g., a bill validator cage configured to securely store a cash box containing money in an electronic gaming machine) is shown. The enclosure 400 includes a plurality of walls 402 and a door 404 movable between a closed position (FIG. 4A) and an open position (FIG. 4B). The walls 402 and the door 404 in the closed position (FIG. 4) collectively define an interior 406 configured to securely store one or more objects (e.g., the cash box) and an open position (FIG. 5) to permit access to the one or more objects in the interior of the enclosure 400. In some implementations, a modular locking apparatus 408 as discussed in detail with reference to FIGS. 6 through 18B may be mounted to a surface of the door 404 facing the interior. In this implementation, the modular locking apparatus 408 includes a first set 414 of one or more latches (FIG. 6) and a second set 416 of one or more latches (FIG. 6). Each latch in the first set 414 of one or more latches (FIG. 6) and each latch in the second set 416 of one or more latches (FIG. 6) are configured to be inserted in corresponding cutouts 410 in the walls 402 of the enclosure 400 to engage the corresponding walls 402 so as to collectively secure the door 404 in the closed position when the door 404 is in the closed position and each latch in the first set 414 of one or more latches and each latch in the second set 416 of one or more latches are in the corresponding latched state (FIGS. 9 through 12). The modular locking apparatus 408 may include a first actuator 412 and a lockout device 418 each having an actuator accessible from an exterior of the enclosure 400 via one or more openings in the door 404. Responsive at least in part to the first actuator 412 transitioning from a first state (FIGS. 11 and 12) to a second state (FIGS. 13 and 14), each latch in the first set 414 of one or more latches and each latch in the second set 416 of one or more latches are configured to be removed from the corresponding cutouts 410 and spaced apart from the walls 402 so as to collectively release the door 404 from the closed position and allow it to be transitioned to the open position when each latch in the first set 414 of one or more latches and each latch in the second set 416 of one or more latches are caused to transition from the corresponding latched state (FIGS. 9 to 12) to the corresponding unlatched state (FIGS. 13 to 16). As can be seen, the cutouts 410 are configured to receive the first set 414 of one or more latches and the second set 416 of one or more latches of the modular locking apparatus 408 (FIG. 6). The cutouts 410 are further configured to receive the first set 514 of one or more latches (e.g., the broad surface 514 in FIGS. 20A and 20B) and the second set 516 of one or more latches (e.g., the edge 516 in FIG. 20B) of the modular locking apparatus 508 (FIGS. 19A to 20B). Stated another way, each cutout 410 has a minimum cross-sectional area that is larger than each latch in the first set of latches and each latch in the second set of latches for a corresponding one of the modular locking apparatus 408 (FIGS. 6 to 18B) and the modular locking apparatus 508 (FIGS. 19A to 20B), such that either one of the modular locking apparatus 408 (FIGS. 6 to 18B) and the modular locking apparatus 508 (FIGS. 19A to 20B) can be installed in the door 404 to hold the door 404 in the closed position (FIG. 4A).

Figure 5A:
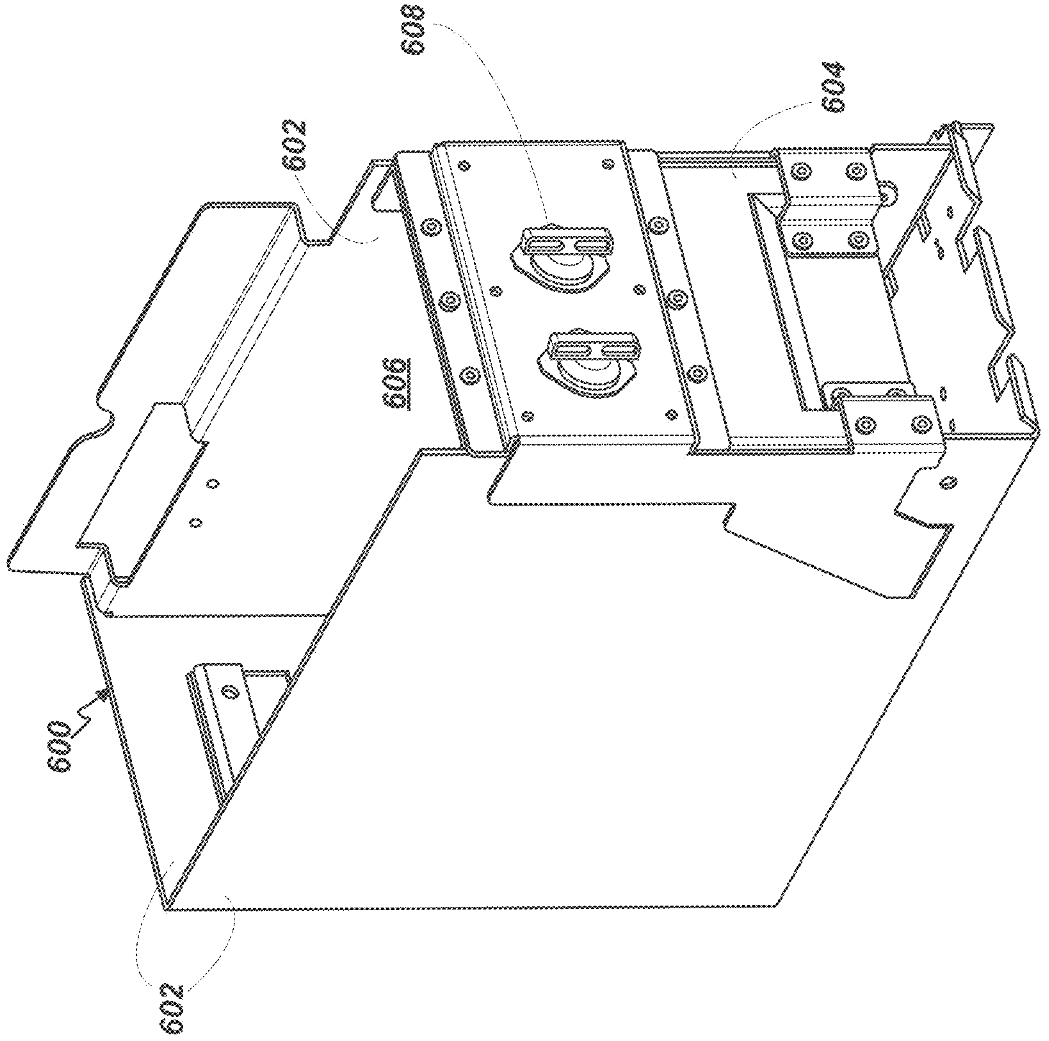
FIGS. 5A and 5B depict perspective views of another example implementation of an enclosure for a gaming machine cabinet, with the enclosure having a plurality of walls and a door movable between a closed position (FIG. 5A) to collectively define an interior and an open position (FIG. 5B).
Figure 5B:
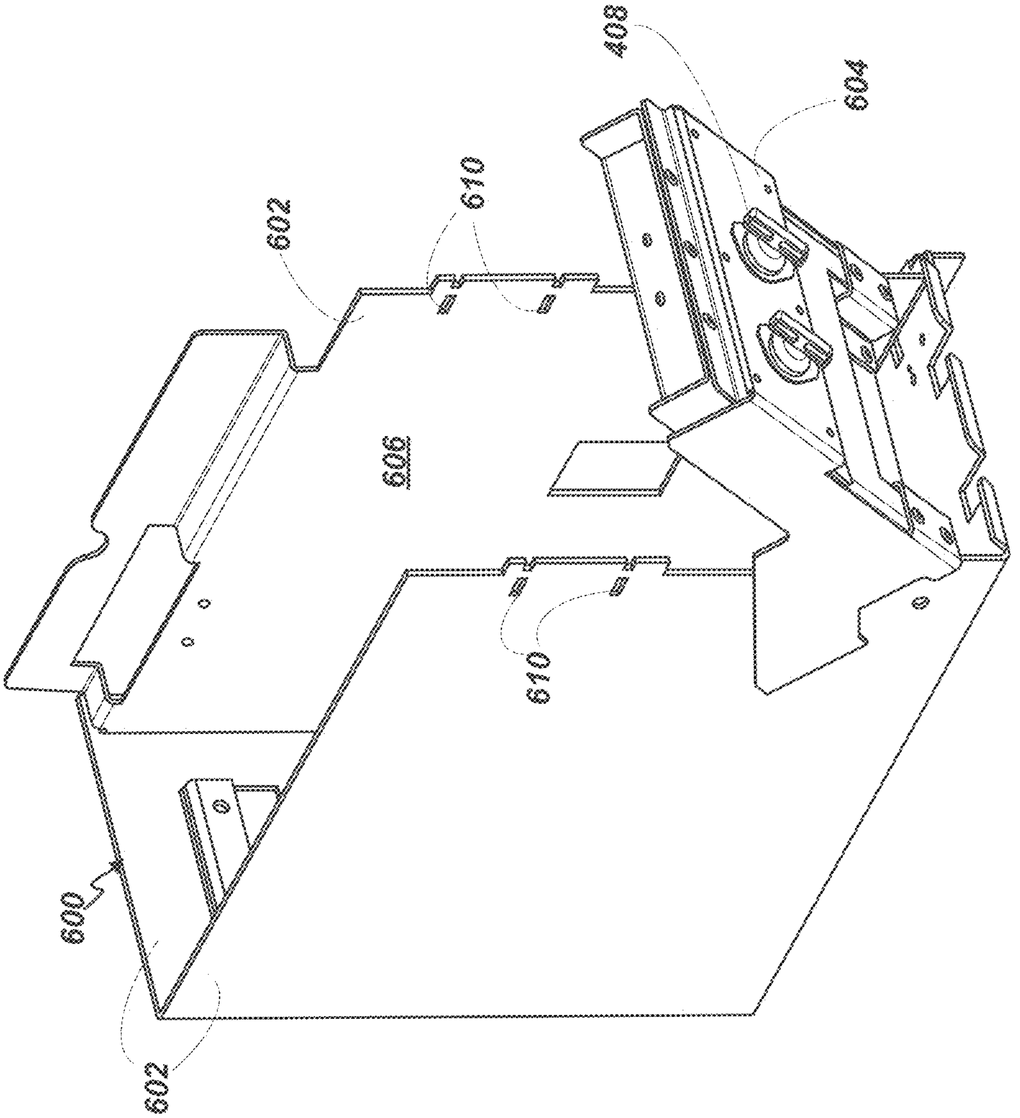

FIGS. 5A and 5B depict another implementation of an enclosure 600 that is somewhat similar to the enclosure 400 of FIGS. 4A and 4B. To avoid undue repetition, elements in the implementation of FIGS. 4A and 4B that are analogous to elements shown in FIGS. 5A and 5B are called out with numbers that share the same last two digits as those analogous elements in FIGS. 5A and 5B. Thus, the discussion provided above with respect to the elements of the implementation of FIGS. 4A and 4B will be understood to be equally applicable to the analogous elements in FIGS. 5A and 5B unless indicated otherwise. In the interest of conciseness, discussion of these elements that would be redundant of earlier discussion herein of similar elements is not provided, with the understanding that the earlier discussion of such elements is applicable to these similar elements in FIGS. 5A and 5B. While each cutout 410 in FIG. 4B has a minimum cross-sectional area that is larger than each latch in the first set of latches and each latch in the second set of latches for a corresponding one of the modular locking apparatus 408 (FIGS. 6 to 18B) and the modular locking apparatus 508 (FIGS. 19A to 20B), such that either one of the modular locking apparatus 408 (FIGS. 6 to 18B) and the modular locking apparatus 508 (FIGS. 19A to 20B) can be installed in the door 404 to hold the door 404 in the closed position (FIG. 4A), the cutouts 610 of FIG. 5B are configured to receive a corresponding latch in the first set 614 of latches and a corresponding latch in the second set 416 of latches of the modular locking apparatus 408 (FIGS. 6 to 18B). However, in this implementation, each cutout 616 has a cross-sectional area that is smaller than the corresponding latch in the first set 414 of latches and the corresponding latch 416 in the second set of latches, such that the latches (e.g., broad surface 614) of the modular locking apparatus 508 (FIGS. 19A to 20B) cannot be inserted into the corresponding cutout 610. It is contemplated that the modular locking apparatus can be installed in any suitable access panel, door, or slide-out tray, or separate enclosures (e.g., a bill validator cage).

Figure 6:
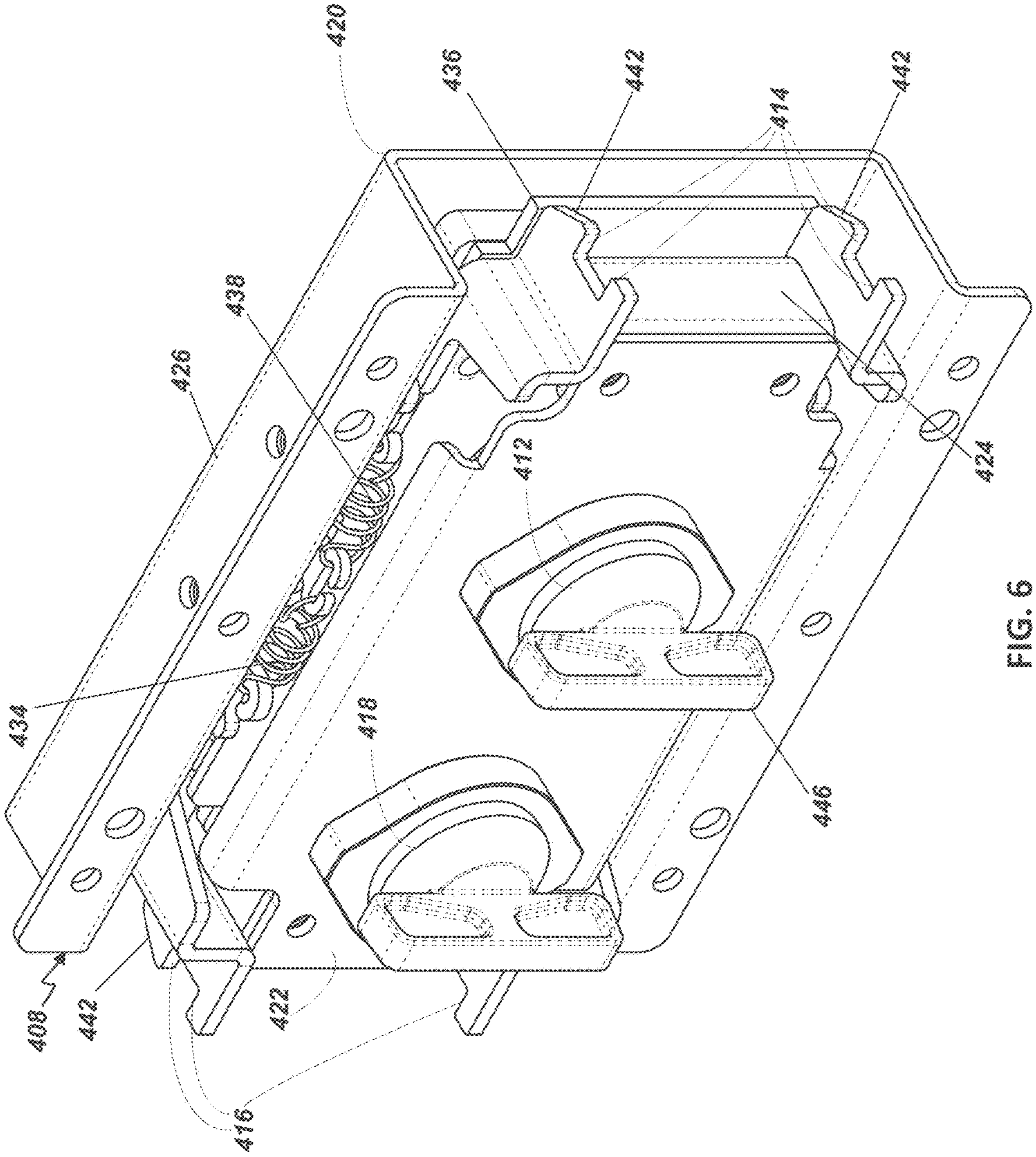
FIG. 6 depicts a front perspective view of an example modular locking apparatus configured to be installed in the enclosure shown in FIG. 4.
Figure 7:
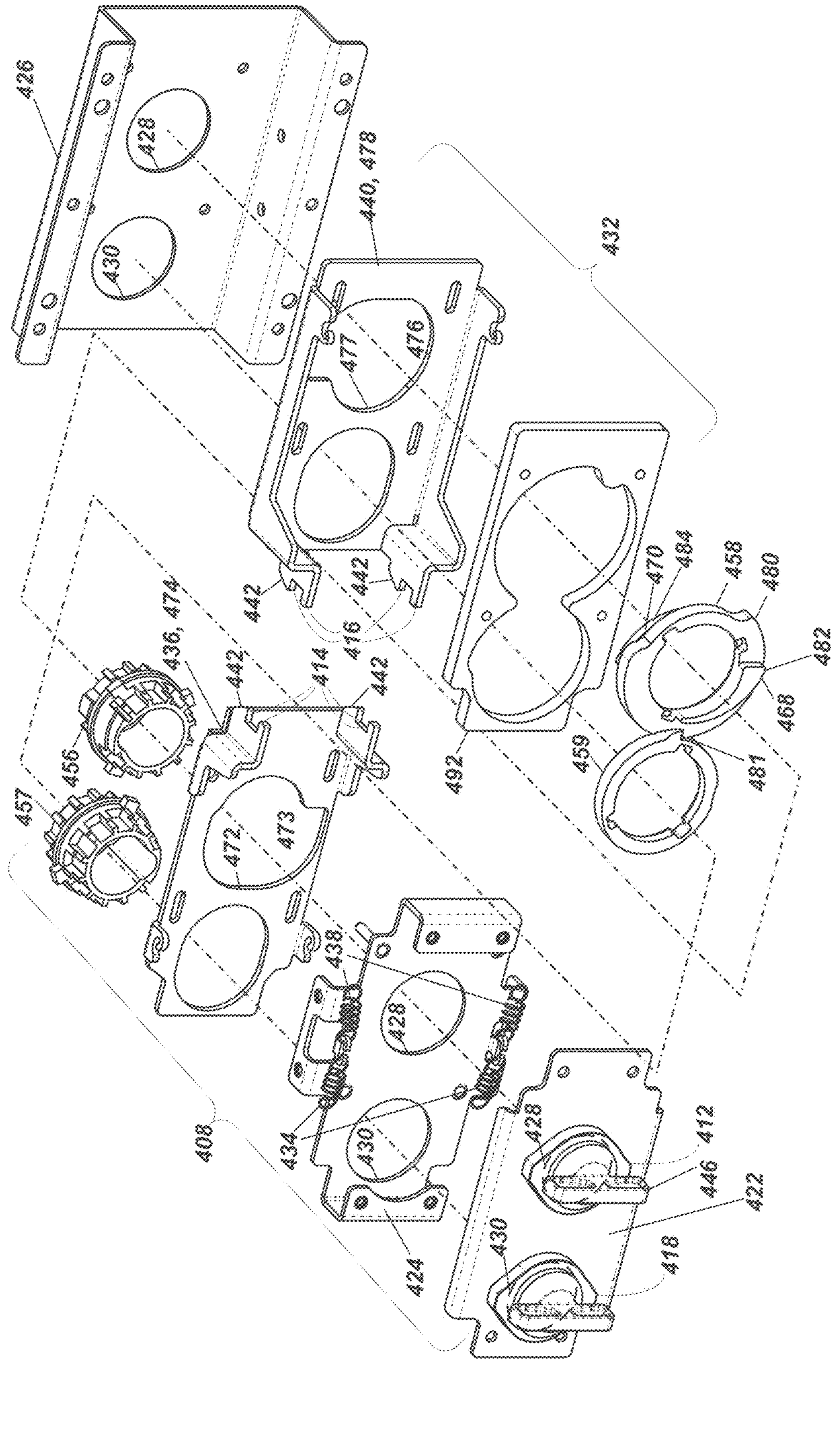
FIG. 7 depicts a partially exploded front perspective view of the modular locking apparatus of FIG. 6, showing the modular locking apparatus including a housing, a first actuator, an actuator adaptor, a common cam member, a lockout device, a lockout adaptor, and a lockout cam member.

In FIG. 7, the modular locking apparatus 408 includes a housing 420 having a first panel 422 (i.e., a front plate), a support bracket 424, and a second panel 426 (e.g., a back U-shaped plate) each with an actuator aperture 428 and a lockout aperture 430. In this implementation, the first panel 422 is connected to the support bracket 424 by a plurality of threaded fasteners (not shown). Also, in this implementation, the second panel 426 is connected to a side (e.g., a top side) of the support bracket 424 by a plurality of fasteners (not shown), such that a latching mechanism 432 as discussed with reference to FIGS. 6 to 18B may be contained between the support bracket 424 and the second panel 426 without subjecting the latching mechanism 432 to a compressive load that would have been associated with the second panel 426 being connected to a surface of the support bracket spaced from the side of the support bracket and facing the second panel 426. The support bracket 424 may, as shown here, be a single-piece design or may be a multi-piece design in which the various separate pieces are bolted, welded, or otherwise joined together to form a generally rigid structure. The second panel 426 is further connected to the door 404 so as to cause the first panel 422 to be positioned adjacent to the door 404.

The modular locking apparatus 408 further includes a first actuator 412 transitionable between a first state (FIGS. 11 and 12) to a second state (FIGS. 13 and 14) relative to the housing 420. While this implementation of the modular locking apparatus 408 includes multiple components interposed between the first actuator and the multiple latches as discussed with reference to FIG. 7, each latch in the first set 414 of one or more latches and each latch in the second set 416 of one or more latches simultaneously transition from the latched state to the unlatched state responsive, at least in part, to the first actuator 412 transitioning from the first state to the second state. Furthermore, each latch in the first set 414 of one or more latches and each latch in the second set 416 of one or more latches simultaneously may transition from the unlatched state to the latched state when the first actuator 412 is in the first state. The latching mechanism 432 further includes a first set 434 of one or more force-biasing devices in connection between the housing 420 (e.g., the support bracket 424) and the first set 414 of one or more latches (e.g., the first latch body 436 including the first set 414 of one or more latches). The first set 434 of one or more force-biasing devices is configured to urge the first set of one or more latches from the unlatched position to the latched position. The latching mechanism 432 further includes a second set 438 of one or more force-biasing devices in connection between the housing 420 (e.g., the support bracket 424) and the second set 416 of one or more latches (e.g., the second latch body 440 including the second set 416 of one or more latches). The second set 438 of one or more force-biasing devices is configured to urge the second set 416 of one or more latches from the unlatched position to the latched position.

Figure 15:
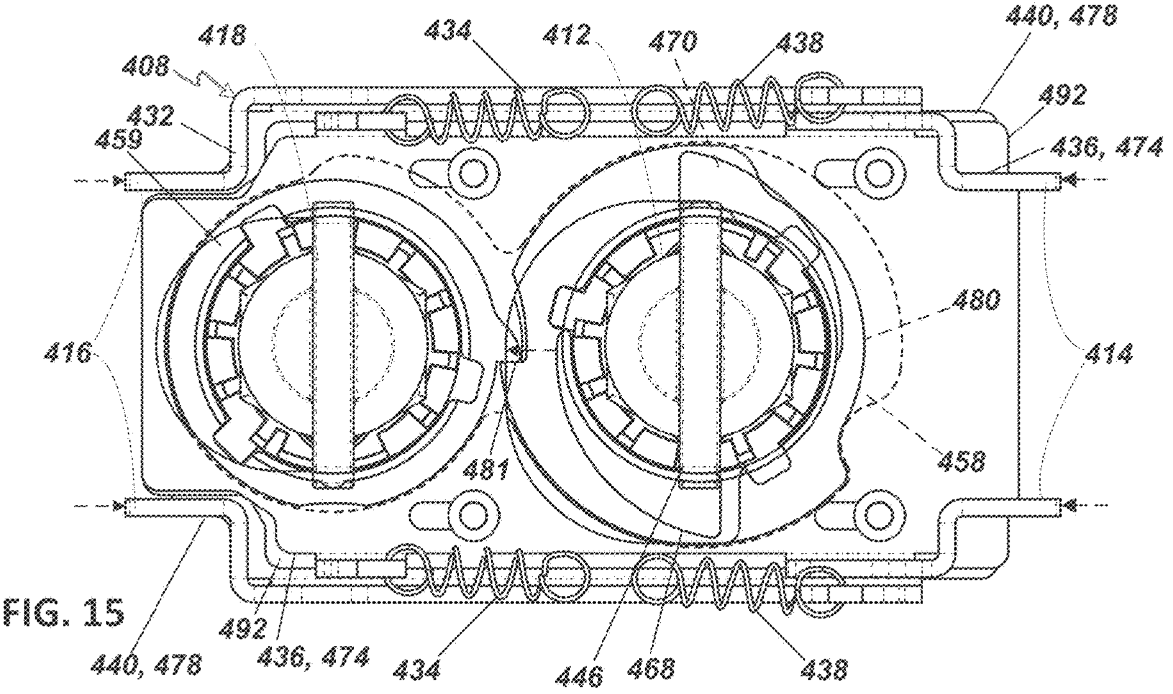
FIGS. 15 and 16 depict front and back views of the modular locking apparatus in FIG. 6 without the housing to show the modular locking apparatus in a locked-and-unlatched state.
Figure 16:
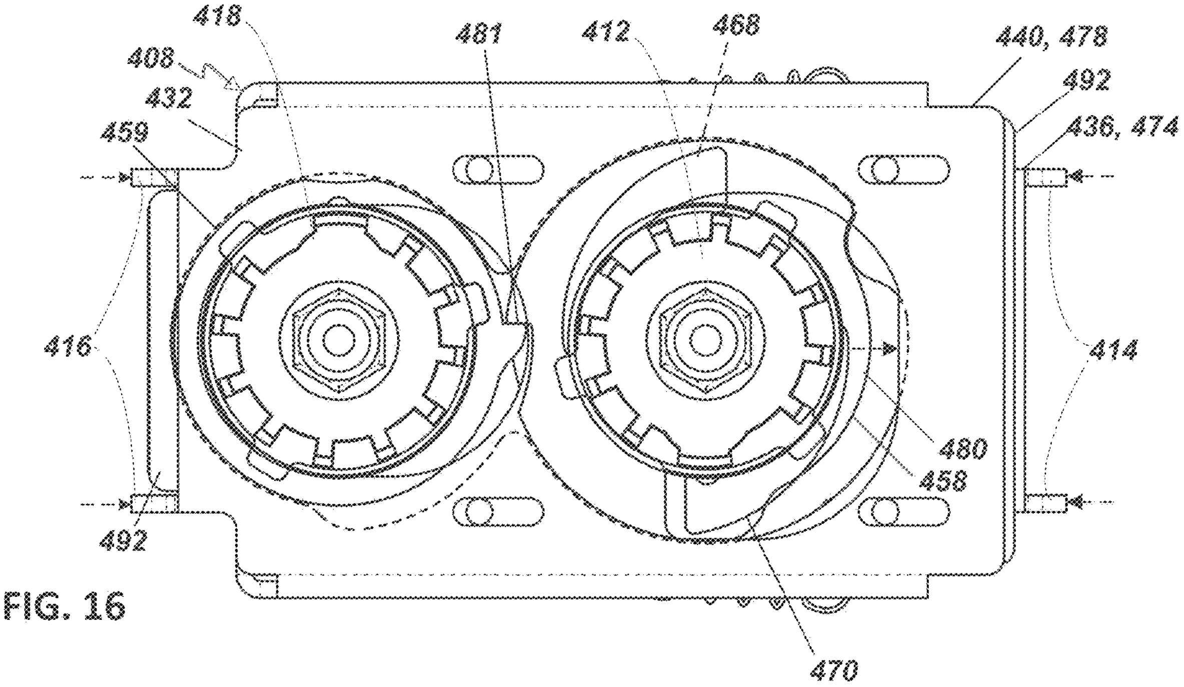
Figure 17:
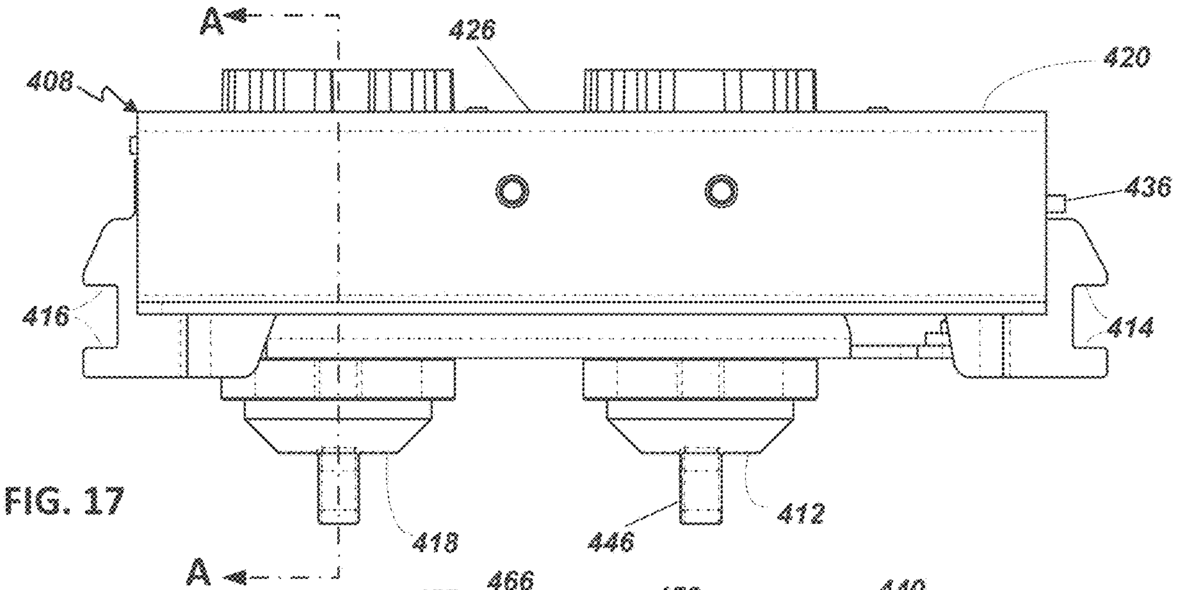
FIG. 17 depicts a top plan view of the modular locking apparatus of FIG. 6.

In FIGS. 7, 15, and 16, each latch in the first set 414 of one or more latches and each latch in the second set 416 of one or more latches includes a tapered feature 442 (FIGS. 6 and 7) configured to engage one or more walls 402 when the door 404 is moved from the open position (FIG. 5) toward the closed position (FIG. 4) so as to exert an opposing lateral force on those tapered features 442 to move the corresponding latches toward the unlatched state until the door reaches the closed position where the corresponding walls or corresponding striker plates may be spaced from the latches such that the corresponding force-biasing devices return the first set of one or more latches and/or the second set 416 of one or more latches to the corresponding latched position.

The first actuator 412 is one actuator selected from a set of two or more actuators having a corresponding one of two or more different configurations to receive an input from a human to cause each latch in a first set 414 of one or more latches and each latch in a second set 416 of one or more latches (i.e., four or more latches as can be seen in FIGS. 6 and 7) to simultaneously transition from a latched state to an unlatched state (i.e., without needing to modify any components of the modular locking apparatus 408 before installing any of those actuators). More specifically, a first actuator in the set of two or more actuators has an end portion including a first cam element. The first cam element, when the first actuator is installed in the actuator aperture 428 in the first panel 422 of the housing 420, is spaced a first distance from the first panel 422 and located in a first position along the first center axis. A second actuator in the set of two or more actuators has an end portion including a second cam element. The second cam element, when the second actuator is installed in the actuator aperture 428 in the first panel 422, is spaced a second distance from the first panel 422 and located in a second position along the first center axis, with the second distance being longer than the first distance.

Figure 8:
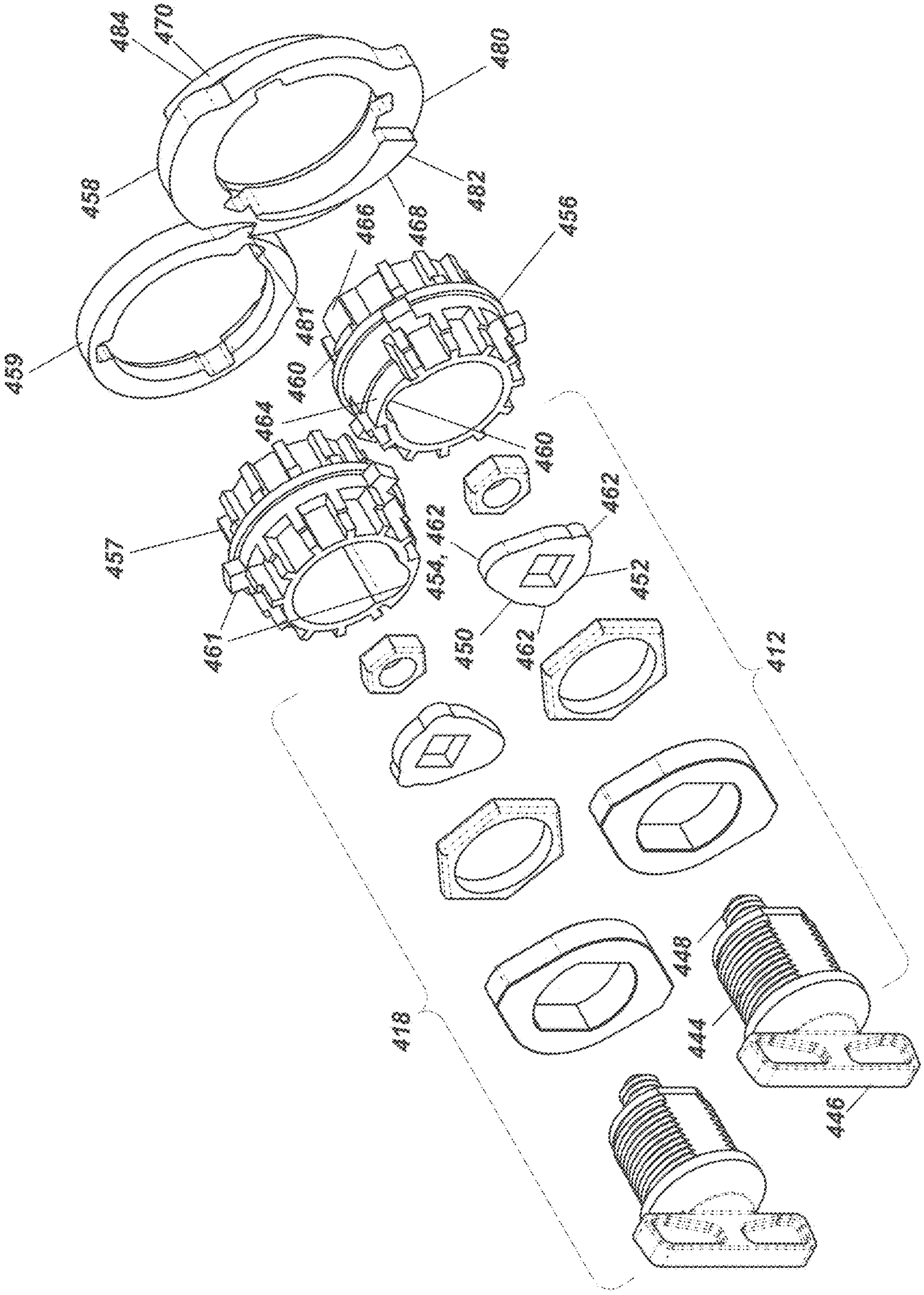
FIG. 8 depicts an exploded view of some of the elements shown in FIG. 7.
Figure 9:
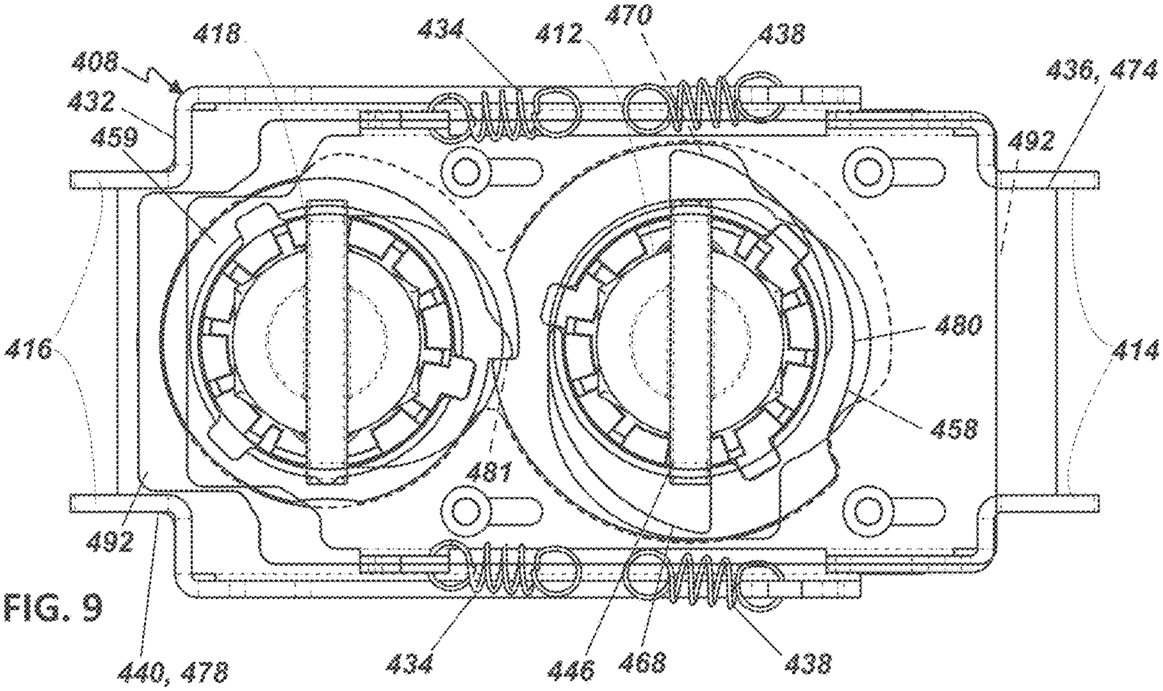
FIGS. 9 and 10 depict front and back views of the modular locking apparatus in FIG. 6 without the housing to show the modular locking apparatus in a locked-and-latched state.
Figure 10:
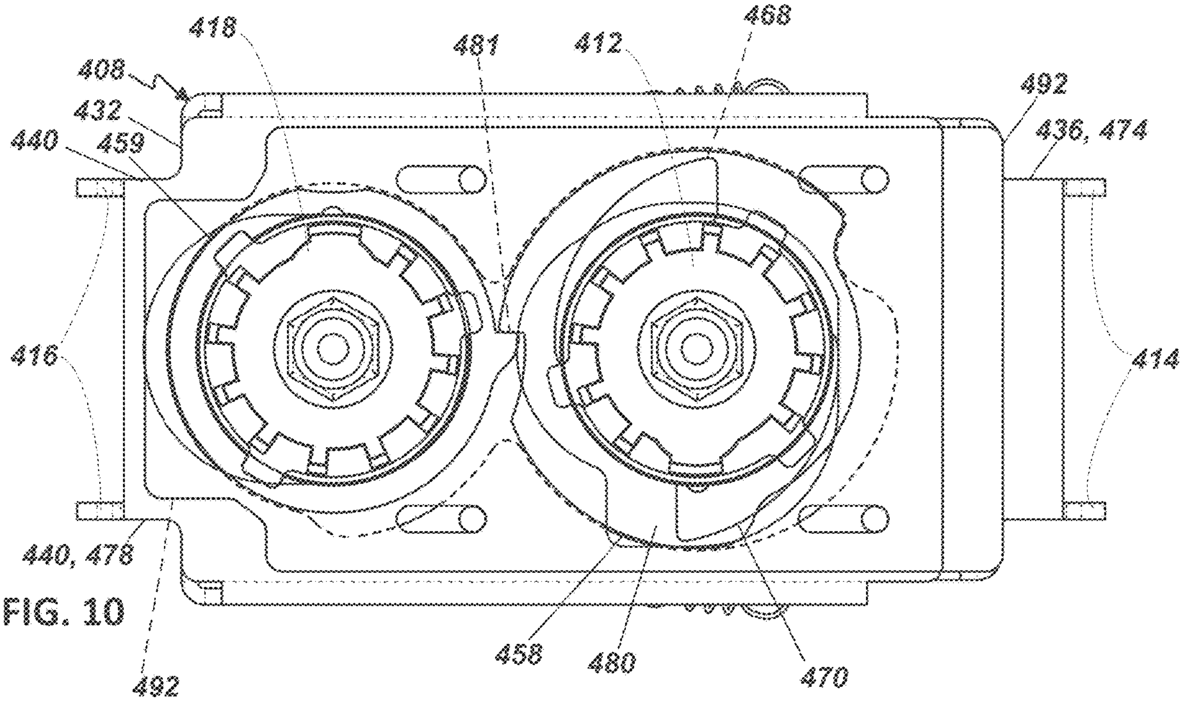
Figure 11:
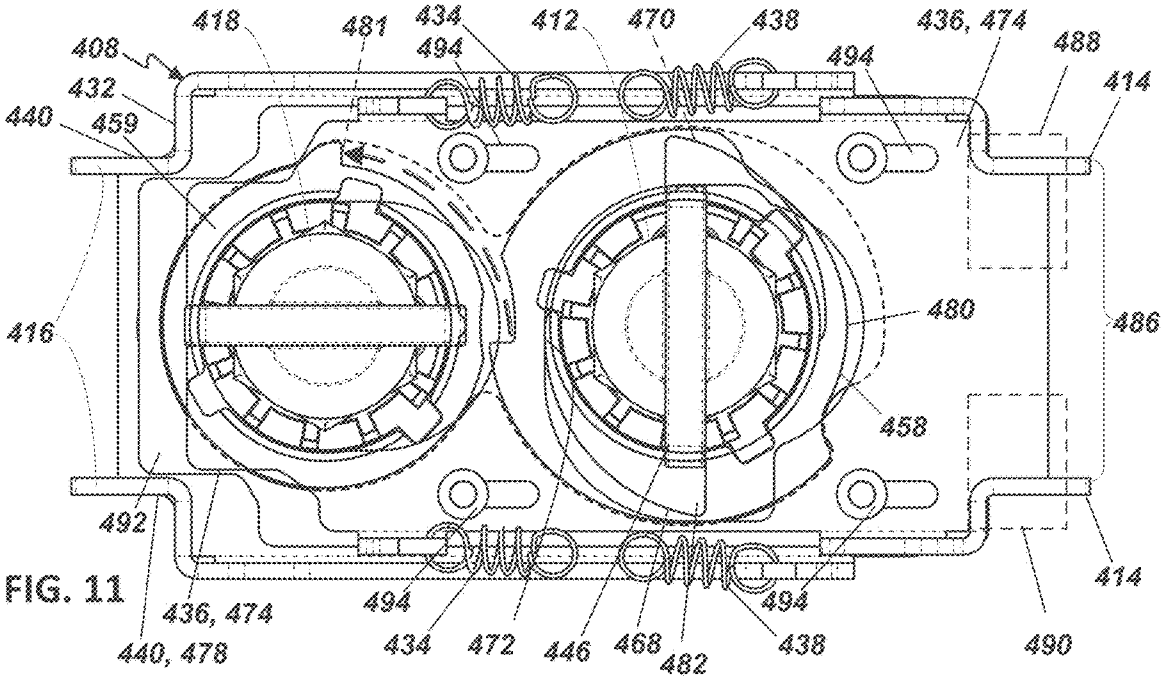
FIGS. 11 and 12 depict front and back views of the modular locking apparatus in FIG. 6 without the housing to show the modular locking apparatus in an unlocked-and-latched state.
Figure 12:
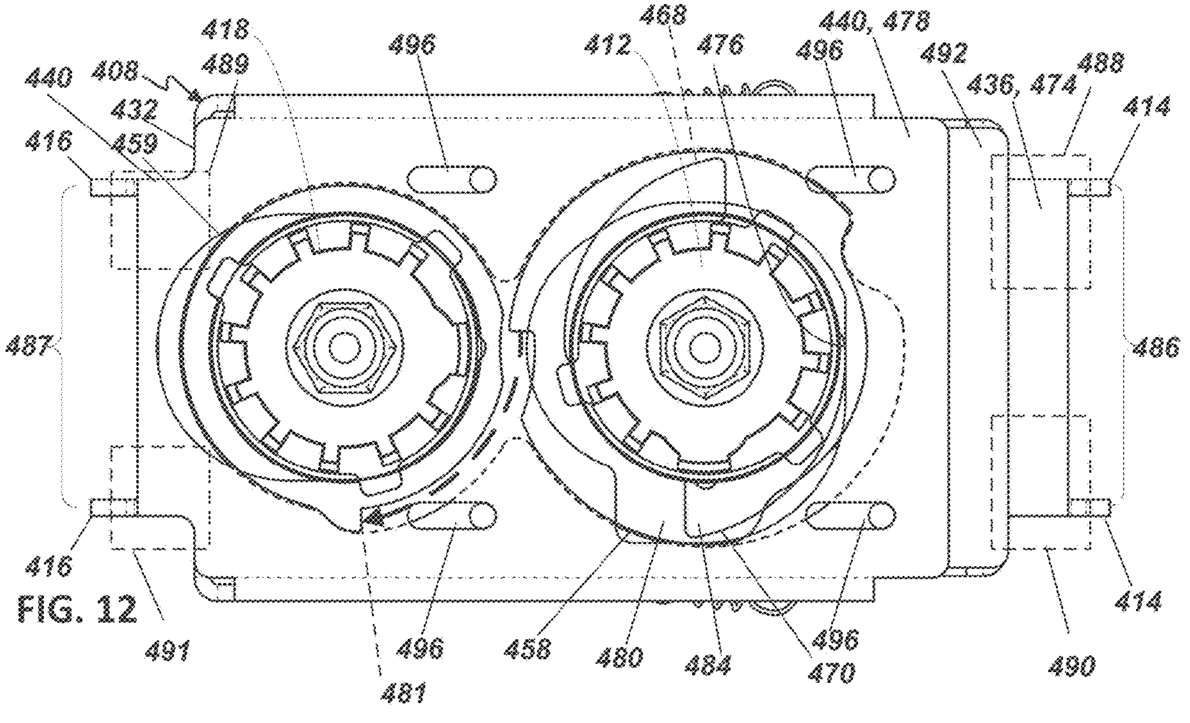

For example, when a new modular locking apparatus 408 has been purchased directly from a manufacturer or distributor, the first actuator installed in the new modular locking apparatus 408 may be a dummy lock without a lock cylinder (i.e., a thumb lock that does not require a key to transition the first actuator from a first state to a second state). As can be seen in FIG. 8, the example dummy lock may include a threaded main body 444 installed in the actuator aperture 428 in the first panel 422 of the housing 420. The dummy lock may be secured in place in the actuator aperture 428 by a threaded nut (not called out, but visible in FIG. 8). The dummy lock may further include a manually-operated handle 446 (e.g., a knob, a wing nut, etc.) rotatable relative to the threaded main body 444 and a threaded rotatable element 448 (e.g., the smaller-diameter threaded portion relative to the main body 444) that may rotate about the first center axis relative to the main body 444 when the handle 446 is rotated about the first center axis. The dummy lock may further include a cam element 450 having a proximal end surface 452 and a distal end surface 454. The proximal end surface 452 of each cam element 450 may be positioned closer to the first center axis for the dummy lock than the distal end surface 454 for that dummy lock. The cam element 450 may be connected with the threaded rotatable element 448 by a threaded nut (not called out, but visible in FIG. 8), so as to constrain rotational movement of the cam element 450 relative to the rotatable element 448, such that the cam element 450 transitions between the first state and the second state responsive, at least in part, to a human rotating the handle 446 in a corresponding one of two rotational directions. In this implementation, the cam element of one or more actuators in the set of two or more actuators may be a quarter-turn cam such that the cam element fully transitions between the first state and the second state responsive to rotating the cam element about the first center axis by 90 degrees. In other implementations, the cam element of one or more actuators in the set of two or more actuators may include other suitable cams (e.g., one or more half-turn cams such that the corresponding cam elements fully transition between the first state and the second state responsive to rotating the cam element about the first center axis by 180 degrees, one or more full-turn cams such that the corresponding cam elements fully transition between the first state and the second state responsive to rotating the cam element about the first center axis by 360 degrees, etc.). As discussed in detail below, one or more other actuators in the set of two or more actuators may not be a dummy lock and instead be a cam lock (i.e., an actuator cam lock) from a set of two or more cam locks (i.e., two or more actuator cam locks) having a plurality of lock cylinders with a plurality of corresponding configurations (e.g., different lock cylinder lengths).

Figure 18A:
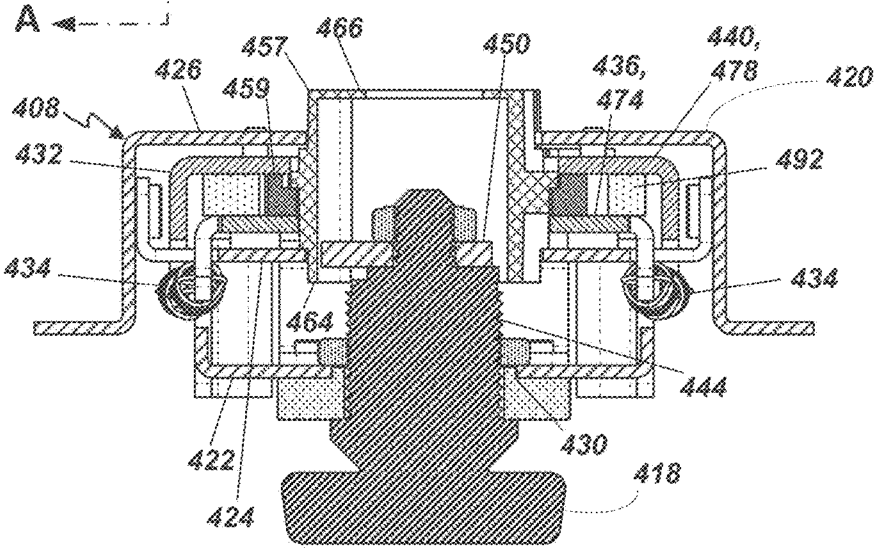
FIG. 18A depicts a cross-sectional view of the modular locking apparatus as taken along line A-A in FIG. 17, illustrating a first lockout cam lock in a set of two or more lockout cam locks having a first cam element in a first position and a lockout adaptor constraining rotation of the first cam element relative to a cam member.
Figure 18B:
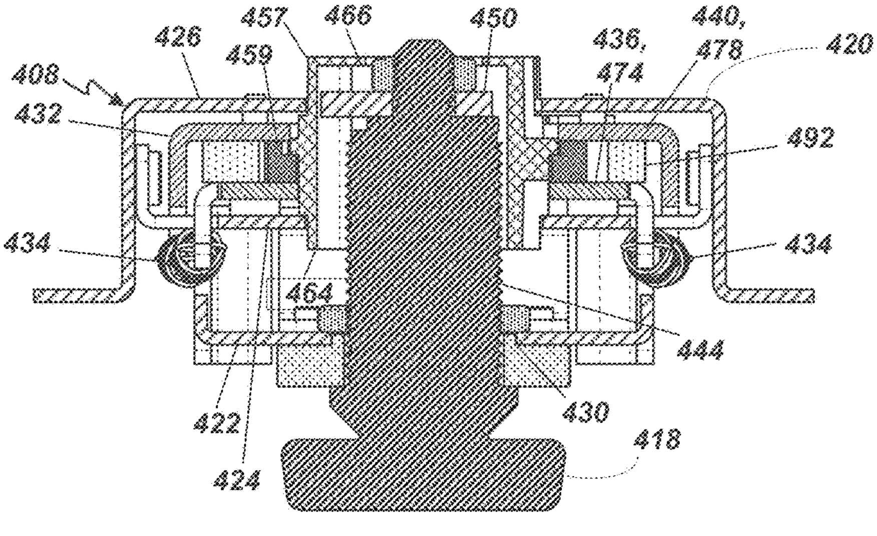
FIG. 18B depicts a cross-sectional view of the modular locking apparatus as taken along line A-A in FIG. 17, illustrating a second cam lock in the set of two or more lockout cam locks having a second cam element in a second position and the lockout adaptor constraining rotation of the second cam element relative to the cam member.
Figure 19A:
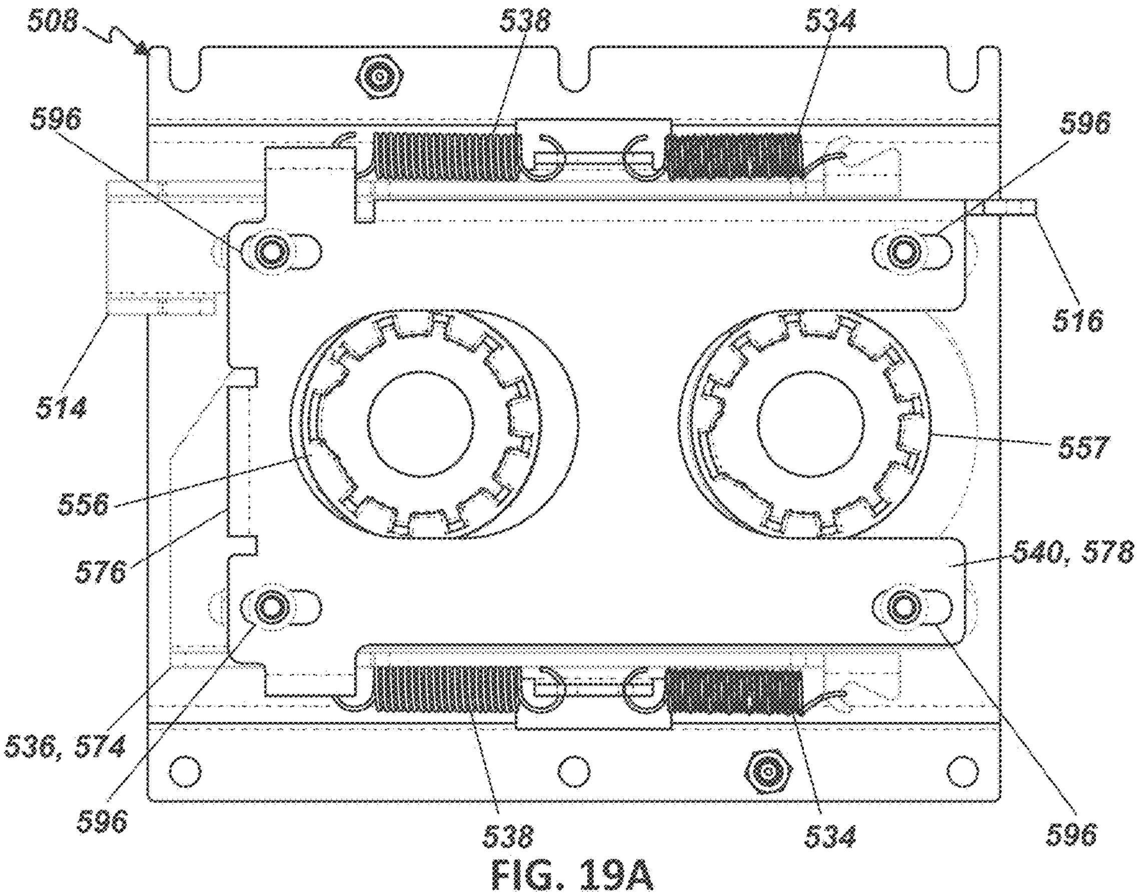
FIG. 19A depicts a back view of another example modular locking apparatus configured to be installed in the enclosure in FIG. 4, without a back plate to show the modular locking apparatus in an unlocked-and-latched state and having a first latch plate with two latches and a second latch plate with a single latch.
Figure 19B:
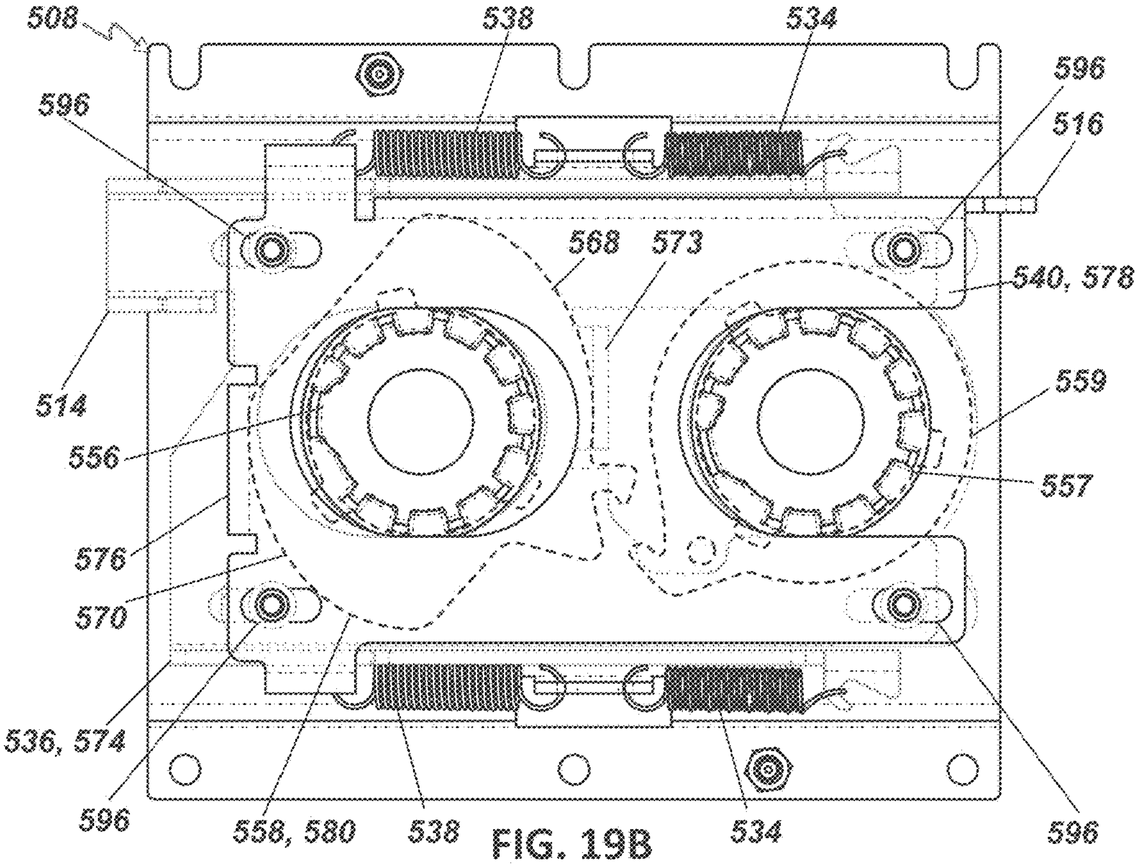
FIG. 19B depicts a back view of the modular locking apparatus of FIG. 19B, illustrating a common cam member and a lockout cam member disposed between the first latch plate and the second latch plate.
Figure 20A:
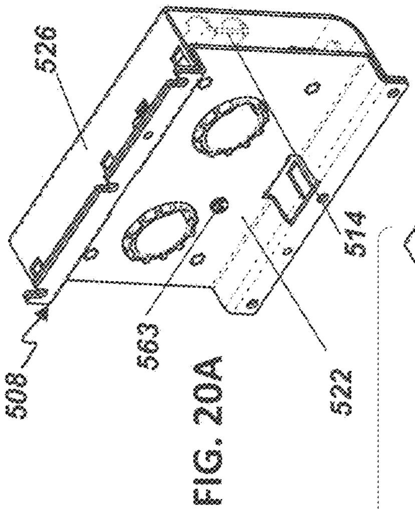
FIG. 20A depicts a front perspective view of the modular locking apparatus shown in FIG. 19A, showing the modular locking apparatus with the back plate.
Figure 20B:
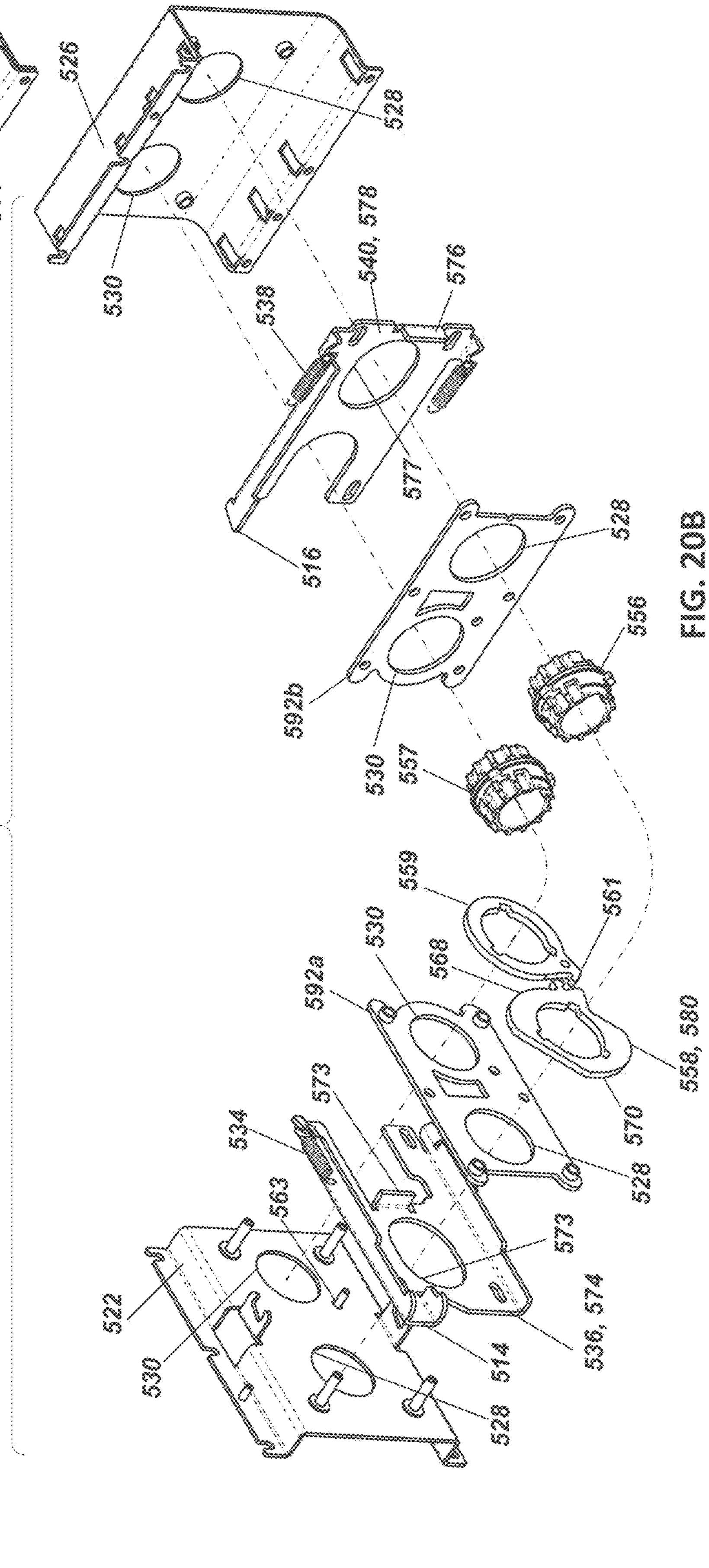
FIG. 20B depicts an exploded view of the modular locking apparatus of FIG. 20A.

Each cam lock (i.e., each actuator cam lock) in the set of two or more cam locks (i.e., two or more actuator cam locks each having a different length) may have a plurality of corresponding configurations to be installed in the modular locking apparatus 408 (i.e., by an actuator adaptor 456 as discussed with reference to FIGS. 18A and 18B). Each cam lock may be keyed to a common key or a batch of keys to transition that cam lock from the first state to the second state thereby causing each latch in a first set 414 of one or more latches and each latch in a second set 416 of one or more latches (e.g., four latches as can be seen in FIGS. 6 and 7) to simultaneously transition from a latched state to an unlatched state (i.e., without needing to modify any components of the modular locking apparatus 408 before installing any of those cam locks). More specifically, a first cam lock in the set of two or more cam locks has a first length and includes a lock cylinder having an end portion with a first cam element. The first cam element, when the first cam lock is installed in the actuator aperture 428 in the first panel 422 of the housing 420, is located a first distance from the first panel 422 and located in a first position along a first center axis when the first cam lock is connected to the first panel 422. A second cam lock in the set of two or more cam locks has a second length (i.e., a second length greater than the first length) and includes a lock cylinder having an end portion with a second cam element. The second cam lock, when the second cam lock is installed in the actuator aperture 428 in the first panel 422, is located a second distance from the housing and located in a second position along the first center axis, with the second distance being longer than the first distance. Stated another way, the set of compatible cam locks that can be installed in the modular locking apparatus may have a plurality of lock cylinders with a plurality of lengths different from one another.

For example, when a first gambling facility obtains and installs its own preferred cam lock (i.e., the second actuator in FIG. 18B) in the modular locking apparatus 408 (i.e., to replace a dummy lock, e.g., the first actuator in FIG. 18A, in a newly purchased modular locking apparatus 408 or to replace an obsolete cam lock in an earlier model of the modular locking apparatus 408), that preferred cam lock may have a first configuration (e.g., a first lock cylinder configuration extending a first length along the center axis) and/or sold by a first vendor preferred by that first gambling facility. Moreover, when a second gambling facility obtains and installs its own preferred cam lock (i.e., a third actuator) different from that preferred by the first gambling facility, that preferred cam lock may have a second configuration (e.g., a second lock cylinder configuration extending a second length along the center axis, with the second length being greater than the first length) and/or sold by a second vendor different from the first vendor and preferred by that second gambling facility.

In FIGS. 7 and 8, the latching mechanism 432 further includes a common cam member 458 and an actuator adaptor 456 configured to constrain rotation of the cam element 450 of each actuator in the set of two or more actuators (e.g., dummy locks, actuator cam locks, etc.) and transmit a rotational force from the cam element 450 of the corresponding actuators to the common cam member 458 when such actuator is installed in the actuator aperture 428 of the first panel 422. The actuator adaptor 456 includes a plurality of actuator keying features 460, e.g., flats, notches, or other features, that may interlock with corresponding actuator keying features 462 on the cam element 450 and the common cam member 458 in order to rotationally lock the cam element 450 into place relative to the common cam member 458. Stated another way, the actuator keying features 460 on the actuator adaptor 456 are configured to interlock with corresponding actuator keying features 462 on the cam element 450 (e.g., the dummy lock, the actuator cam lock, etc.) and the common cam member 458 so as to constrain rotation of the actuator 450 relative to the common cam member 458 and transmit a rotational force from the actuator 450 to the common cam member 458. The keying features 460 on the actuator adaptor 456 extend along the first center axis from a first adaptor end portion at a first position to a second adaptor end portion at a second position along the first center axis such that the actuator adaptor 456 is configured to allow an actuator from among set of two or more actuators (e.g., dummy locks, actuator cam locks, etc.) each having a different length to be installed in the modular locking apparatus 408. Stated another way, those keying features 460 are configured to interlock with the first cam element in the first position when the first actuator having a first length is connected to the housing 420 and the second cam element in the second position when the second actuator having a second length great than the first length is connected to the housing 420. The length of the keying features 460 is at least the difference between the first distance that the first cam element is spaced from the first panel 422 and the second distance that the second cam element is spaced from the first panel 422 such that the keying feature 460 in the first adaptor end portion 464 is configured to engage the first cam element in the first position when the first actuator is installed in the actuator aperture 428 in the first panel 422 and the keying feature 460 in the second adaptor end portion 466 is configured to engage the second cam element in the second position when the second actuator is installed in the actuator aperture 428 in the first panel 422. In one implementation, the one or more keying features 460 of the actuator adaptor 456 interlocking with the cam element 450 may extend a length up to 1.25 inches along the center axis (e.g., within a range being between about 0.50 inches and 1.00 inches, such as 0.60 inches). In other implementations, the length of the one or more keying features 460 may be above 1.25 inches.

Figure 13:
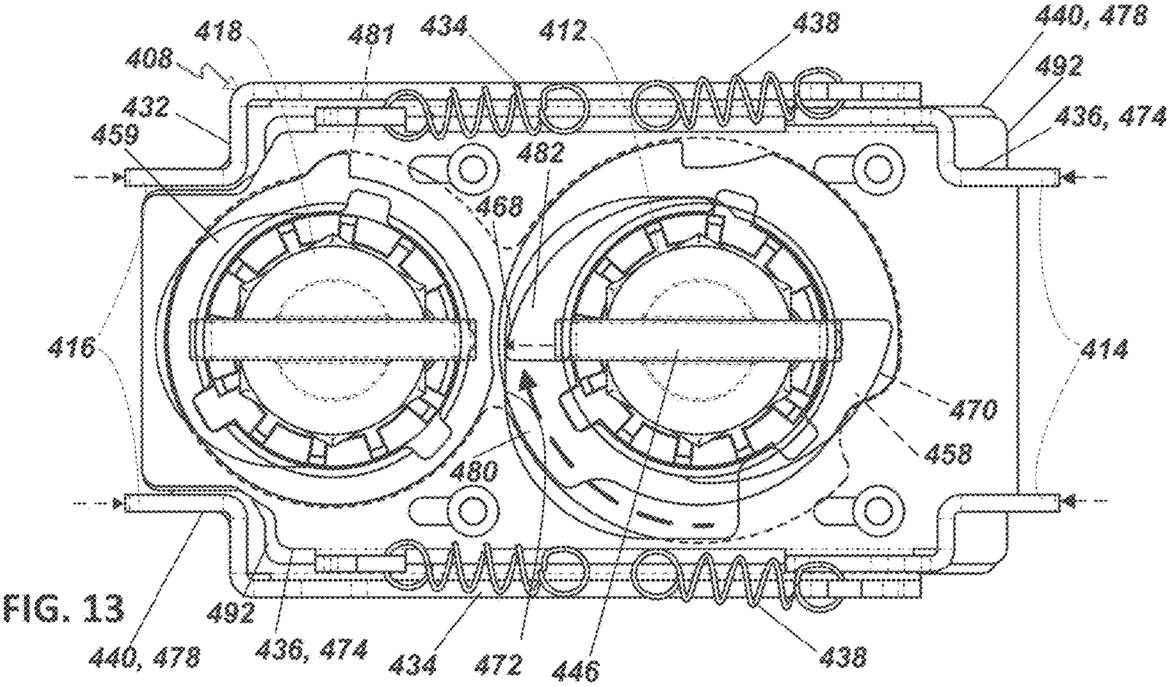
FIGS. 13 and 14 depict front and back views of the modular locking apparatus in FIG. 6 without the housing to show the modular locking apparatus in an unlocked-and-unlatched state.
Figure 14:
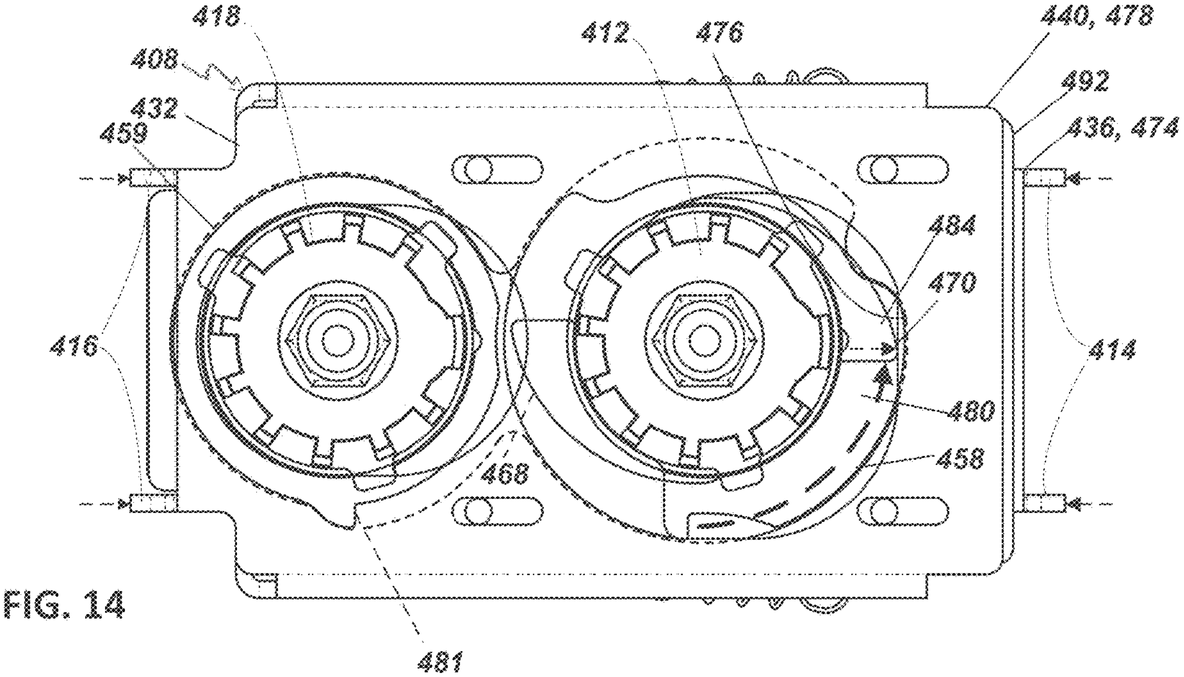

The common cam member 458 is rotatable about the first center axis relative to the housing 420 between a first rotational position (FIGS. 9 to 12) and a second rotational position (FIGS. 13-16). In FIGS. 9 to 16, at least a portion of the lines illustrating structure of the common cam member 458 (e.g., one or more segments of a collar portion 480) and the actuator adaptor 456 may be hidden in the associated view but presented in solid line segments. As can be seen in FIGS. 7, 13, and 14, the common cam member 458 has a first cam surface 468 and a second cam surface 470 configured to simultaneously exert, responsive to the common cam member 458 rotating from the first rotational position to the second rotational position, an opposing lateral force on a corresponding one of a first latch body 436 (e.g., on a first cam follower surface 472, such as a first edge of a first latch plate 474 having the first set 414 of one or more latches) and a second latch body 440 (e.g., on a second cam follower surface 476, such as a second edge of a second latch plate 478 having the second set 416 of one or more latches) to cause a corresponding one of the first latch body 436 and the second latch body 440 to simultaneously translate from an extended position (FIGS. 9 to 12) to a retracted position (FIGS. 13 to 16) relative to the housing 420 such that each latch in the first set 414 of one or more latches and each latch in the second set 416 of one or more latches simultaneously transition from the latched state to the unlatched state.

In this implementation, the common cam member 458 includes a collar portion 480 interlocked with the actuator adaptor 456, a first cam portion 482 including the first cam surface 468, and a second cam portion 484 including the second cam surface 470. The first cam portion 482 and the second cam portion 484 extend from the collar portion 480 such that the first cam surface 468 and the second cam surface 470 are spaced from one another along the first center axis. The first cam portion 482 and the second cam portion 484 extend from a corresponding one of opposite faces of the collar portion 480 and along the first center axis, and the first cam portion 482 and the second cam portion 484 are located on diametrically opposite sides of the collar portion 480 and with the first center axis interposed therebetween.

Each latch in the first set 414 of one or more latches and each latch in the second set 416 of one or more latches simultaneously transition from the latched state to the unlatched state responsive, at least in part, to the first actuator 412 transitioning from the first state to the second state. Furthermore, each latch in the first set 414 of one or more latches and each latch in the second set 416 of one or more latches simultaneously may transition from the unlatched state to the latched state when the first actuator 412 is in the first state. The latching mechanism 432 further includes a first set 434 of one or more force-biasing devices in connection between the housing 420 (e.g., the support bracket 424) and the first set 414 of one or more latches, and the first set 434 of one or more force-biasing devices is configured to urge the first set of one or more latches from the unlatched position to the latched position. The latching mechanism 432 further includes a second set 438 of one or more force-biasing devices in connection between the housing 420 (e.g., the support bracket 424) and the second set 416 of one or more latches, and the second set 438 of one or more force-biasing devices is configured to urge the second set 416 of one or more latches from the unlatched position to the latched position.

The latching mechanism 432 further includes the first latch body 436 (i.e., having the first set 414 of one or more latches) translatable along a first translation axis relative to the housing 420 and between an extended position (FIGS. 9 and 11) and a retracted position (FIGS. 13 and 15) relative to the housing 420 to cause each latch in the first set 414 of one or more latches to be in a corresponding one of the latched state and the unlatched state. In this implementation, the first latch body 436 may be the first latch plate 474 including the first cam follower surface 472 (e.g., the first edge or rim) and have a first actuator aperture 473, such that the first cam surface 468 of the common cam member 458 is in the first actuator aperture 473 and exerts an opposing lateral force on the first cam follower surface 472 (e.g., the first edge or rim) to move the first latch body 436 from the extended position to the retracted position relative to the housing 420 when the common cam member 458 rotates from the first rotational position to the second rotational position. The first latch body 436 further includes a side 486 having a first region 488 and a second region 490 spaced apart from one another. A first latch in the first set 414 of one or more latches is located in the first region 488 of the side 486, and a second latch in the first set 414 of one or more latches is located in the second region 490 of the side 486 so as to distribute a latching force across multiple points on the door and the walls of the enclosure.

Somewhat similar to the first latch body 436, the latching mechanism 432 further includes the second latch body 440 (i.e., having the second set 416 of one or more latches) translatable along a second translation axis relative to the housing 420 and between an extended position (FIGS. 10 and 12) and a retracted position (FIGS. 14 and 16) relative to the housing 420 to cause each latch in the second set 416 of one or more latches to be in a corresponding one of the latched state and the unlatched state. However, the first latch body 436 and the second latch body 440 differ from each other in that they move in opposite directions when they move between the extended position to the retracted position relative to the housing 420. In this implementation, the first translation axis and the second translation axis are the same axis. In other implementations, the first translation axis and the second translation axis may be run parallel with each other or intersect one another. The second latch body 440 may be a second latch plate 478 including the second cam follower surface 476 (e.g., the second edge or rim) and have a second actuator aperture 477, such that the second cam surface 470 of the common cam member 458 is in the second actuator aperture 477 and engages the second cam follower surface 476 (e.g., a the second edge or rim) to move the second latch body 440 from the extended position to the retracted position relative to the housing 420 when the common cam member 458 rotates from the first rotational position to the second rotational position. Somewhat analogous to the first latch body 436, the second latch body 440 further includes a side 487 having a first region 489 and a second region 491 spaced apart from one another. A first latch in the second set 416 of one or more latches is located in the first region 489 of the side 487, and a second latch in the second set 416 of one or more latches is located in the second region 491 of the side 487 so as to distribute a latching force across multiple points on the door and the walls of the enclosure.

The latching mechanism 432 further includes a spacer plate 492 disposed between the first latch body 436 and the second latch body 440 to facilitate movement of each of the first latch body 436 and the second latch body 440 between the corresponding extended position and the corresponding retracted position relative to the housing 420. More specifically, the spacer plate 492 and the first latch body 436 have a first pair of sliding interfaces 494 configured to permit the first latch body 436 to translate relative to the spacer plate 492 and the housing 420 along the first translation axis. The first pair of sliding interfaces 494 may include a linear guide element on the spacer plate 492 (e.g., one or more posts extending from the spacer plate 492) and a corresponding linear guide element on the first latch body 436 (e.g., one or more slots in the first latch body 436 each having a first end with a first stop surface and a second end with a second stop surface where a corresponding post in the slot may engage the first stop surface and the second stop surface when the first latch body 436 moves a maximum travel distance relative to the spacer plate 492). The linear guide element on the spacer plate 492 and the corresponding linear guide element on the first latch body 436 may constrain motion of the first latch body 436 relative to the spacer plate 492 to translation along the first translation axis. Similarly, the spacer plate 492 and the second latch body 440 have a second pair of sliding interfaces 496 configured to permit the second latch body 440 to translate relative to the spacer plate 492 and the housing 420 along the second translation axis. The second pair of sliding interfaces 496 may include a linear guide element on the spacer plate 492 (e.g., one or more posts extending from the spacer plate 492) and a corresponding linear guide element on the second latch body 440 (e.g., one or more slots in the second latch body 440 each having a first end with a first stop surface and a second end with a second stop surface where a corresponding post in the slot may engage the first stop surface and the second stop surface when the second latch body 440 moves a maximum travel distance relative to the spacer plate 492). The linear guide element on the spacer plate 492 and the corresponding linear guide element on the second latch body 440 may constrain motion of the second latch body 440 relative to the spacer plate 492 to translation along the second translation axis. The spacer plate includes an actuator clearance aperture 498 in which the collar portion 480 of the common cam member 458 rotates without contacting the spacer plate 492.

As can be seen, this implementation of the modular locking apparatus 408 further includes a lockout device 418 having a lockout cam member 459 rotatable about a second center axis relative to the housing 420 between a third rotational position (FIGS. 9 and 10) and a fourth rotational position (FIGS. 11 and 12) responsive to the lockout device being movable between a corresponding first configuration and a corresponding second configuration relative to the housing 420. In FIGS. 9 to 16, at least a portion of the lines illustrating structure of the lockout cam member 459 and the lockout adaptor 457 may be hidden in the associated view but presented in solid line segments. The lockout cam member 459 in the third rotational position, when the lockout device 418 is in the first configuration, prevents the first actuator 412 from transitioning from the first state to the second state, and the lockout cam member 459 in the fourth rotational position, when the lockout device 418 is in the second configuration, allows the first actuator 412 to transition from the first state to the second state. In other implementations, the modular locking apparatus 408 may not include any components of the lockout device 418, and the first plate 422 may not include the lockout aperture 430, such that the first actuator 412 is free to move from the first state to the second state. In still other implementations, as discussed with reference to the example in FIGS. 20A and 20B, the lockout device 518 may further include a retainer element 563 configured to hold the lockout cam member 559 in the fourth rotational position relative to the housing 512 (e.g., the first panel 522, the support brackets 592*a*, 592*b*, and/or the second panel 526) when, for example, the lockout cam lock 518 is removed from the modular locking apparatus 508 and the first panel 522 does not include the lockout aperture 530, etc.). Stated another way, in other implementations, the lockout device 418 may be modified (i.e., to remove the lockout cam lock) or entirely removed from the modular locking apparatus 408 (i.e., to remove the locking cam lock, the lockout adaptor 557 and the lockout cam member 459), such that the lockout cam lock 459 does not prevent the first actuator 412 from transitioning from the first state to the second state.

The lockout device 418 includes a lockout cam member 459 rotatable about a second center axis relative to the housing 420 between a third rotational position and a fourth rotational position. The lockout cam member 459, when in the third rotational position, includes a locking feature 481 (e.g., a projection, one or more stop surfaces) in a locked position configured to exert a resultant force with a tangential component on the common cam member 458 so as to block movement of the common cam member from the first rotational position to the second rotational position. The lockout cam member 459, when in the fourth rotational position, includes the locking feature 481 in an unlocked position spaced from the common cam member 458 to provide clearance for rotation of the common cam member 458 from the first rotational position to the second rotational position.

Similar to one example first actuator 412 being one cam lock (i.e., one actuator cam lock) in a set two or more cam locks (i.e., two or more actuator cam locks) each configured to be installed in the modular locking apparatus 408 to allow a rotational force to be transmitted to the common cam member 458 by the actuator adaptor 456, one example lockout device 418 may include one cam lock (i.e., one lockout cam lock) in a set two or more cam locks (i.e., two or more lockout cam locks) each configured to be installed in the modular locking apparatus 408 to allow a rotational force to be transmitted to the lockout cam member 459 by a lockout adaptor 457. In one implementation (not shown), the first actuator installed in in the modular locking apparatus 408 is an actuator cam lock with a first lock cylinder keyed for a first key, and the lockout device installed in the modular locking apparatus 408 is a lockout cam lock with a second lock cylinder keyed for a second key different from the first key. The lockout adaptor 457 may have a plurality of lockout keying features 461 configured to interlock with the lockout cam lock and the lockout cam member 459 so as to constrain rotation of the lockout cam lock relative to the lockout cam member 459 and transmit a rotational force from the lockout cam lock to the lockout cam member 459. The lockout keying features 461 of the lockout adaptor 457 extend along the second center axis such that those lockout keying features 461 are configured to interlock with each lockout cam lock in the set of two or more lockout cam locks when that corresponding lockout cam lock is installed in the housing, The lockout keying features 461 of the lockout adaptor 457 extend along the second center axis such that those lockout keying features 461 are configured to interlock with the first cam element in the first position when the first lockout cam lock is connected to the housing and the second cam element in the second position when the second lockout cam lock is connected to the housing.

In another implementation, as can be seen in FIG. 8, when a customer purchases a new modular locking apparatus 408 from a manufacturer or a distributor, both of the first actuator and the lockout device may be dummy locks without lock cylinders.

The lockout cam lock is one lockout cam lock in a set of two or more lockout cam locks having a plurality of corresponding configurations. A first lockout cam lock in the set of two or more lockout cam locks includes a lock cylinder having an end portion with a first cam element. The first cam element, when the first lockout cam lock is installed in the lockout aperture 430, is located a third distance from the first panel 422, and located in a third position along the second center axis when the first lockout cam lock is connected to the first panel 422. A second lockout cam lock in the set of two or more lockout cam locks includes a lock cylinder having an end portion with a second cam element. The second cam element, when the second lockout cam lock is installed in the lockout aperture 430 in the first panel 422, is located a fourth distance from the first panel 422 and located in a fourth position along the second center axis, with the fourth distance being longer than the third distance. Stated another way, the set of compatible lockout cam locks that can be installed in the modular locking apparatus may have a plurality of lock cylinders with a plurality of lengths different from one another.

FIG. 19A-20B depict another implementation of a modular locking apparatus 508 that is somewhat similar to the modular locking apparatus 408 of FIGS. 6, 7, 11, and 12. To avoid undue repetition, elements in the implementation of FIGS. 6, 7, 11, and 12 that are analogous to elements shown in FIGS. 19A to 20B are called out with numbers that share the same last two digits as those analogous elements in FIGS. 19A to 20B. Thus, the discussion provided above with respect to the elements of the implementation of FIGS. 6, 7, 11, and 12 will be understood to be equally applicable to the analogous elements in FIGS. 19A to 20B unless indicated otherwise. In the interest of conciseness, discussion of these elements that would be redundant of earlier discussion herein of similar elements is not provided, with the understanding that the earlier discussion of such elements is applicable to these similar elements in FIGS. 19A to 20B.

While the common cam member 458 in FIGS. 6, 7, 11, and 12 has the first cam surface 468 and the second cam surface 470 on opposite sides of the collar portion 480 relative to the first center axis (i.e., the first cam surface 468 and the second cam surface 470 are spaced apart from each other along the first center axis), the common cam member 558 in FIGS. 19A to 20B has the first cam surface 568 and the second cam surface 570 that are edges of the collar portion 580 (i.e., coplanar with the collar portion 580 at a common location along the first center axis).

Furthermore, while the first cam follower surface 472 and the second cam follower surface 476 in FIGS. 6, 7, 11, and 12 are a corresponding edge of the first latch plate 474 (i.e., coplanar with the first latch plate 474) and a corresponding edge of the second latch plate 478 (i.e., coplanar with the second latch plate 474), the first cam follower surface 572 and the second cam follower surface 576 in FIGS. 19A to 20B are a corresponding tab extending from the first latch plate 574 (e.g., tab 572 extending perpendicularly from the first latch plate 574) and the second latch plate 578 (e.g., tab 576 extending perpendicularly from the second latch plate 578). Surfaces of the tab 572 and the tab 576 facing the common cam member 558 provide a corresponding one of the first cam follower surface and the second cam follower surface.

The first latch plate 574 and the second latch plate 578 in FIGS. 19A-20B further differ from the first latch plate 474 and the second latch plate 478 in FIGS. 6, 7, 11, and 12 in the number of latches in the first set of one or more latches and the number of latches in the second set of one or more latches. More specifically, the first latch plate 474 and the second latch plate 478 in FIGS. 6, 7, 11, and 12 each have two latches, i.e., the first latch in the first region 488 and the second latch in the second region 490. However, the first latch plate 574 and the second latch plate 578 in FIGS. 19A to 20B each have a single latch, e.g., 514 and 516, i.e., in the first region 588. Moreover, while the modular locking apparatus 408 in FIGS. 6, 7, 11, and 12 include the single spacer plate 492, the modular locking apparatus 508 in FIGS. 19A to 20B include two spacer plates 592*a*, 592*b*.

As discussed above, the modular locking apparatus 508 in FIG. 20B further differs from the modular locking apparatus 408 in FIG. 7 in that the modular locking apparatus 508 may further include the retainer element 563 (e.g., a threaded fastener) configured to hold the lockout cam member 559 in the fourth rotational position relative to the housing 520 such that the lockout cam member 559 does not prevent the common cam member 558 transitioning from the first rotational position to the second rotational position. Any implementation of the modular locking apparatus 508 may include the retainer element 563, omit the locking cam lock of the lockout device 518, omit the entire lockout device 518 (i.e., the locking cam lock, the lockout adaptor 557 and the lockout cam member 559), and have the first panel 522 of the housing 520 without the lockout aperture 530.

It is to be understood that the phrases "for each <item> of the one or more <items>," "each <item> of the one or more <items>," or the like, if used herein, are inclusive of both a single-item group and multiple-item groups, i.e., the phrase "for . . . each" is used in the sense that it is used in programming languages to refer to each item of whatever population of items is referenced. For example, if the population of items referenced is a single item, then "each" would refer to only that single item (despite the fact that dictionary definitions of "each" frequently define the term to refer to "every one of two or more things") and would not imply that there must be at least two of those items.

The term "between," as used herein and when used with a range of values, is to be understood, unless otherwise indicated, as being inclusive of the start and end values of that range. For example, between 1 and 5 is to be understood to be inclusive of the numbers 1, 2, 3, 4, and 5, not just the numbers 2, 3, and 4.

The use, if any, of ordinal indicators, e.g., (a), (b), (c) . . . or the like, in this disclosure and claims is to be understood as not conveying any particular order or sequence, except to the extent that such an order or sequence is explicitly indicated. For example, if there are three steps labeled (i), (ii), and (iii), it is to be understood that these steps may be performed in any order (or even concurrently, if not otherwise contraindicated) unless indicated otherwise. For example, if step (ii) involves the handling of an element that is created in step (i), then step (ii) may be viewed as happening at some point after step (i). Similarly, if step (i) involves the handling of an element that is created in step (ii), the reverse is to be understood. It is also to be understood that use of the ordinal indicator "first" herein, e.g., "a first item," should not be read as suggesting, implicitly or inherently, that there is necessarily a "second" instance, e.g., "a second item."

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. An apparatus comprising:

a housing;

a first actuator transitionable between a first state and a second state;

a latching mechanism with a first set of one or more latches and a second set of one or more latches; and a lockout device movable between a first configuration and a second configuration relative to the housing, wherein:

each latch in the first set of one or more latches is configured to be transitioned between a corresponding latched state and a corresponding unlatched state, each latch in the second set of one or more latches is configured to be transitioned between a corresponding latched state and a corresponding unlatched state, each latch in the first set of one or more latches and each latch in the second set of one or more latches simultaneously transitions from the corresponding latched state to the corresponding unlatched state responsive to the first actuator transitioning from the first state to the second state, each latch in the first set of one or more latches and each latch in the second set of one or more latches simultaneously transition from the corresponding unlatched state to the corresponding latched state when the first actuator is in the first state, the lockout device, when in the first configuration, prevents the first actuator from transitioning from the first state to the second state, and the lockout device, when in the second configuration, allows the first actuator to transition from the first state to the second state.

2. The apparatus of claim 1, wherein the latching mechanism further comprises:

a first latch body including the first set of one or more latches, the first latch body translatable relative to the housing and between an extended position relative to the housing and a retracted position relative to the housing to cause each latch in the first set of one or more latches to be in a corresponding one of the corresponding latched state and the corresponding unlatched state;

a second latch body including the second set of one or more latches, the second latch body translatable relative to the housing and between an extended position relative to the housing and a retracted position relative to the housing to cause each latch in the second set of one or more latches to be in a corresponding one of the corresponding latched state and the corresponding unlatched state; and a common cam member rotatable about a first center axis relative to the housing and between a first rotational position relative to the housing and a second rotational position relative to the housing;

wherein the common cam member has a first cam surface and a second cam surface collectively configured to simultaneously exert, responsive to the common cam member rotating from the first rotational position to the second rotational position, an opposing lateral force on a corresponding one of the first latch body and the second latch body and cause a corresponding one of the first latch body and the second latch body to simultaneously translate from the extended position to the retracted position such that each latch in the first set of latches and each latch in the second set of latches transitions from the corresponding latched state to the corresponding unlatched state.

3. The apparatus of claim 2, wherein:

the housing includes a panel having an actuator aperture in which the first actuator Is installed, the first actuator includes a cam element rotatable about the first center axis when the first actuator is installed in the actuator aperture in the panel, and the latching mechanism further comprises an actuator adaptor having two or more keying features configured to interlock with a corresponding one of the cam element and the common cam member so as to constrain rotation of the actuator adaptor relative to the cam element and the common cam member and transmit a rotational force from the cam element to the common cam member.

4. The apparatus of claim 3, wherein the first actuator is one actuator from a set of two or more actuators each having a different length, wherein:

the first actuator in the set of two or more actuators has an end portion including a first cam element, the first cam element, when the first actuator is installed in the actuator aperture in the panel, is spaced a first distance from the panel and located in a first position along the first center axis, a second actuator in the set of two or more actuators has an end portion including a second cam element, the second cam element, when the second actuator is installed in the actuator aperture in the panel, is spaced a second distance from the panel and located in a second position along the first center axis, and each corresponding actuator keying feature extends along the first center axis such that those keying features are configured to interlock with the first cam element in the first position when the first actuator is installed in the actuator aperture in the panel and the second cam element in the second position when the second actuator is installed in the actuator aperture in the panel.

5. The apparatus of claim 4, wherein:

the corresponding actuator keying features of the actuator adaptor interlocking with the cam element extend a length along the first center axis from a first adaptor end portion to a second adaptor end portion, and the length is at least the difference between the first distance from the panel and the second distance from the panel such that the first adaptor end portion of the corresponding actuator keying features are configured to engage the first cam element in the first position when the first actuator is installed in the actuator aperture in the panel and the second adaptor end portion of the corresponding actuator keying features are configured to engage the second cam element in the second position when the second actuator is installed in the actuator aperture in the panel.

6. The apparatus of claim 4, wherein the corresponding actuator keying features of the actuator adaptor interlocking with the cam element extend a length up to 1.25 inches along the first center axis.

7. The apparatus of claim 3, wherein the common cam member comprises:

a collar portion interlocked with the actuator adaptor;

a first cam portion including the first cam surface;

a second cam portion including the second cam surface; and wherein the first cam portion and the second cam portion extend from the collar portion such that the first cam surface and the second cam surface are spaced from one another along the first center axis.

8. The apparatus of claim 7, wherein the first cam portion and the second cam portion extend from opposite faces of the collar portion and along the first center axis.

9. The apparatus of claim 7, wherein the first cam portion and the second cam portion are located on diametrically opposite sides of the collar portion and with the first center axis interposed therebetween.

10. The apparatus of claim 7, wherein:

the first latch body includes a first actuator aperture, the second latch body includes a second actuator aperture, the first actuator is one actuator from a set of two or more actuators, wherein:

the first actuator in the set of two or more actuators has an end portion including a first cam element, the first cam element is, when the first actuator is installed in the actuator aperture in the panel, spaced a first distance from the panel and located in a first position along the first center axis, a second actuator in the set of two or more actuators has an end portion including a second cam element, the second cam element, when the second actuator is installed in the actuator aperture in the panel, is spaced a second distance from the panel and located in a second position along the first center axis, and the first cam portion is in the first actuator aperture of the first latch body and the second cam portion is in the second actuator aperture of the second latch body when the first actuator is installed in the actuator aperture in the panel and when the second actuator is installed in the actuator aperture in the panel.

11. The apparatus of claim 10, wherein:

the latching mechanism further comprises a spacer plate disposed between the first latch body and the second latch body, the spacer plate and the first latch body have a first pair of sliding interfaces configured to permit the first latch body to translate relative to the spacer plate and the housing along a first translation axis, and the spacer plate and the second latch body have a second pair of sliding interfaces configured to permit the second latch body to translate relative to the spacer plate and the housing along a second translation axis.

12. The apparatus of claim 11, wherein:

the spacer plate includes an actuator clearance aperture, and the collar portion is in the actuator clearance aperture of the spacer plate when the first actuator is connected to the housing and also when the second actuator is connected to the housing.

13. The apparatus of claim 2, wherein:

the first latch body comprises a first plate including a first cam follower surface;

the second latch body comprises a second plate including a second cam follower surface; and the first cam surface and the second cam surface of the common cam member each exert an opposing lateral force on a corresponding one of the first cam follower surface of the first plate and the second cam follower surface of the second plate to cause a corresponding one of the first set of one or more latches and the second set of one or more latches to simultaneously transition from the corresponding latched state to the corresponding unlatched state responsive to the common cam member rotating from the first rotational position to the second rotational position.

14. The apparatus of claim 2, wherein:

the first latch body includes a side having a first region and a second region spaced apart from one another, a first latch in the first set of one or more latches is located in the first region of the side, and a second latch in the first set of one or more latches is located in the second region of the side.

15. The apparatus of claim 2, wherein:

the second latch body includes a side having a first region and a second region spaced apart from one another, a first latch in the second set of one or more latches is located in the first region of the side, and a second latch in the second set of one or more latches is located in the second region of the side.

16. The apparatus of claim 2, further comprising:

an enclosure having a plurality of walls and a door movable between an open position and a closed position, the plurality of walls and the door collectively defining an interior when the door is in the closed position, wherein:

each latch in the first set of one or more latches and each latch in the second set of one or more latches is configured to engage one or more of the walls so as to collectively secure the door in the closed position when the door is in the closed position and each latch in the first set of one or more latches and each latch in the second set of one or more latches is in the corresponding latched state, each latch in the first set of one or more latches and each latch in the second set of one or more latches is configured to be spaced apart from the walls so as to collectively release the door from the closed position and allow the door to be transitioned to the open position when each latch in the first set of one or more latches and each latch in the second set of one or more latches is caused to transition from the corresponding latched state to the corresponding unlatched state, and each latch in the first set of one or more latches and each latch in the second set of one or more latches includes a tapered feature configured to engage, when each latch in the first set of one or more latches and each latch in the second set of one or more latches are in the corresponding latched state and the door is moved from the open position toward the closed position, one or more walls to cause those latches to move from the corresponding latched state to the corresponding unlatched state and permit the door to be moved to the closed position.

17. The apparatus of claim 1, wherein:

the first actuator is an actuator cam lock, the lockout device is a lockout cam lock, and the latching mechanism includes:

a common cam member rotatable about a first center axis relative to the housing between a first rotational position and a second rotational position, wherein the common cam member has a first cam surface and a second cam surface configured to, responsive to the common cam member rotating from the first rotational position to the second rotational position, simultaneously transition each latch in the first set of latches and each latch in the second set of latches transition from the corresponding latched state to the corresponding unlatched state, an actuator adaptor having one or more actuator keying features configured to interlock with the actuator cam lock and the common cam member so as to constrain rotation of the actuator cam lock relative to the common cam member and transmit a rotational force from the actuator cam lock to the common cam member, a lockout cam member rotatable about a second center axis relative to the housing between a third rotational position and a fourth rotational position, wherein the lockout cam member, when in the third rotational position, includes a locking feature in a locked position configured to engage the common cam member and block movement of the common cam member from the first rotational position to the second rotational position, and wherein the lockout cam member, when in the fourth rotational position, includes the locking feature in an unlocked position spaced from the common cam member to provide clearance for rotation of the common cam member from the first rotational position to the second rotational position, and a lockout adaptor having one or more lockout keying features configured to interlock with the lockout cam lock and the lockout cam member so as to constrain rotation of the lockout cam lock relative to the lockout cam member and transmit a rotational force from the lockout cam lock to the lockout cam member.

18. The apparatus of claim 17, wherein:

the actuator cam lock is in a set of two or more actuator cam locks having a plurality of corresponding configurations, the actuator keying features of the actuator adaptor extend along the first center axis such that those actuator keying features are configured to interlock with each actuator cam lock in the set of two or more actuator cam locks when that corresponding actuator cam lock is installed in the housing, the lockout cam lock is in a set of two or more lockout cam locks having a plurality of corresponding configurations, and the lockout keying features of the lockout adaptor extend along the second center axis such that those lockout keying features are configured to interlock with each lockout cam lock in the set of two or more lockout cam locks when that corresponding lockout cam lock is installed in the housing.

19. The apparatus of claim 1, wherein the latching mechanism further comprises:

a first set of one or more force-biasing devices interposed between the housing and the first set of one or more latches, the first set of one or more force-biasing devices being configured to urge the first set of one or more latches from the unlatched position to the latched position; and a second set of one or more force-biasing devices interposed between the housing and the second set of one or more latches, and the second set of one or more force-biasing devices being configured to urge the second set of one or more latches from the unlatched position to the latched position.

20. An apparatus comprising:

a first actuator transitionable between a first state and a second state;

a housing including a panel having an actuator aperture in which the first actuator is installed; and a latching mechanism with a first set of one or more latches and a second set of one or more latches, wherein:

each latch in the first set of one or more latches is configured to be transitioned between a corresponding latched state and a corresponding unlatched state, each latch in the second set of one or more latches is configured to be transitioned between a corresponding latched state and a corresponding unlatched state, each latch in the first set of one or more latches and each latch in the second set of one or more latches simultaneously transitions from the corresponding latched state to the corresponding unlatched state responsive to the first actuator transitioning from the first state to the second state, each latch in the first set of one or more latches and each latch in the second set of one or more latches simultaneously transition from the corresponding unlatched state to the corresponding latched state when the first actuator is in the first state, the first actuator includes a cam element rotatable about the first center axis when the first actuator is installed in the actuator aperture in the panel, the latching mechanism further comprises:

a first latch body including the first set of one or more latches, the first latch body translatable relative to the housing and between an extended position relative to the housing and a retracted position relative to the housing to cause each latch in the first set of one or more latches to be in a corresponding one of the corresponding latched state and the corresponding unlatched state, a second latch body including the second set of one or more latches, the second latch body translatable relative to the housing and between an extended position relative to the housing and a retracted position relative to the housing to cause each latch in the second set of one or more latches to be in a corresponding one of the corresponding latched state and the corresponding unlatched state, a common cam member rotatable about a first center axis relative to the housing and between a first rotational position relative to the housing and a second rotational position relative to the housing, and an actuator adaptor having two or more keying features configured to interlock with a corresponding one of the cam element and the common cam member so as to constrain rotation of the actuator adaptor relative to the cam element and the common cam member and transmit a rotational force from the cam element to the common cam member, and the latching mechanism further comprises an actuator adaptor having two or more keying features configured to interlock with a corresponding one of the cam element and the common cam member so as to constrain rotation of the actuator adaptor relative to the cam element and the common cam member and transmit a rotational force from the cam element to the common cam member, and the common cam member has a first cam surface and a second cam surface collectively configured to simultaneously exert, responsive to the common cam member rotating from the first rotational position to the second rotational position, an opposing lateral force on a corresponding one of the first latch body and the second latch body and cause a corresponding one of the first latch body and the second latch body to simultaneously translate from the extended position to the retracted position such that each latch in the first set of latches and each latch in the second set of latches transitions from the corresponding latched state to the corresponding unlatched state.

* * * * *